United States Patent
Kobori et al.

(10) Patent No.: US 7,752,202 B2
(45) Date of Patent: Jul. 6, 2010

(54) INFORMATION PROCESSING AND, CONTENT DISTRIBUTION APPARATUS METHOD, AND PROGRAM WITH CONVERSION IDENTIFICATION INFORMATION

(75) Inventors: Yoichi Kobori, Kanagawa (JP); Toshihiro Morita, Kanagawa (JP); Kazuhiro Honda, Kanagawa (JP)

(73) Assignee: Sony Corporation, Tokyo (JP)

( * ) Notice: Subject to any disclaimer, the term of this patent is extended or adjusted under 35 U.S.C. 154(b) by 216 days.

(21) Appl. No.: 10/483,265

(22) PCT Filed: May 9, 2003

(86) PCT No.: PCT/JP03/05816

§ 371 (c)(1),
(2), (4) Date: Jan. 15, 2004

(87) PCT Pub. No.: WO03/098446

PCT Pub. Date: Nov. 27, 2003

(65) Prior Publication Data

US 2004/0172376 A1    Sep. 2, 2004

(30) Foreign Application Priority Data

May 17, 2002 (JP) ............................. 2002-143907
Feb. 28, 2003 (JP) ............................. 2003-052374

(51) Int. Cl.
*G06F 7/00* (2006.01)
*G06F 17/30* (2006.01)

(52) U.S. Cl. ..................... 707/736; 707/781; 709/203

(58) Field of Classification Search .............. 707/3, 707/203, 1
See application file for complete search history.

(56) References Cited

U.S. PATENT DOCUMENTS 6,151,596 A * 11/2000 Hosomi ..................... 707/1

(Continued)

FOREIGN PATENT DOCUMENTS

EP    0 898 404 A2    2/1999

(Continued)

OTHER PUBLICATIONS

Patent Abstracts of Japan, JP 11-066101, Mar. 9, 1999 (with corr. EP 0 898 404 A2 and US 6,151,596) (reference previously filed in Japanese language on Jan. 15, 2004).

(Continued)

*Primary Examiner*—John R. Cottingham
*Assistant Examiner*—Michael Pham
(74) *Attorney, Agent, or Firm*—Oblon, Spivak, McClelland, Maier & Neustadt, L.L.P.

(57) ABSTRACT

Content that is appropriate according to a specification of client equipment is distributed without having to prepare content of a plurality of formats. When a data list request is received from a client, a server sets a content URL and conversion identification information indicating that the content is original content for content that does not require data conversion. In the case of content for which data conversion is necessary, a virtual URL embedded with data conversion specifying information and conversion identification information indicating the necessity of conversion are set the URL and returned to the client. The server then receives the URL from the client for analysis. If there is no data conversion specifying information, the content is transmitted as it. If data conversion specifying information is embedded, the content is sent to the client after data conversion in accordance with the data conversion specifying information.

12 Claims, 13 Drawing Sheets

U.S. PATENT DOCUMENTS

| | | | |
|---|---|---|---|
| 6,301,617 B1 * | 10/2001 | Carr | 709/227 |
| 6,463,445 B1 * | 10/2002 | Suzuki et al. | 707/200 |
| 6,925,595 B1 * | 8/2005 | Whitledge et al. | 715/513 |
| 7,114,007 B2 * | 9/2006 | Sasaki | 709/246 |
| 7,483,960 B2 * | 1/2009 | Kyusojin | 709/219 |
| 2001/0013070 A1 | 8/2001 | Sasaki | |
| 2001/0017885 A1 | 8/2001 | Asai et al. | |
| 2001/0045422 A1 | 11/2001 | Gouthiere | |
| 2002/0002541 A1 * | 1/2002 | Williams | 705/51 |
| 2002/0010740 A1 * | 1/2002 | Kikuchi et al. | 709/203 |
| 2002/0027992 A1 * | 3/2002 | Matsuyama et al. | 380/231 |
| 2002/0099798 A1 * | 7/2002 | Fedorovsky et al. | 709/219 |
| 2002/0156660 A1 * | 10/2002 | Nishimura et al. | 705/5 |
| 2002/0184223 A1 * | 12/2002 | Miura | 707/10 |
| 2003/0046437 A1 * | 3/2003 | Eytchison et al. | 709/250 |
| 2003/0208610 A1 * | 11/2003 | Rochetti et al. | 709/230 |

FOREIGN PATENT DOCUMENTS

| | | | |
|---|---|---|---|
| EP | 1 124 360 A2 | | 8/2001 |
| EP | 1 199 865 A2 | | 4/2002 |
| GB | 2339374 | * | 6/1999 |
| JP | 10-40187 | | 2/1998 |
| JP | 11-066101 | | 3/1999 |
| JP | 2001-022625 | | 7/1999 |
| JP | 2001-195335 | | 7/2001 |
| JP | 2001-222487 | | 8/2001 |
| JP | 2002-123461 | | 4/2002 |

OTHER PUBLICATIONS

Patent Abstracts of Japan, JP 2001-222487, Aug. 17, 2001 (with corr. EP 1 124 360 A2 and US 2001/0013070 A1) (reference previously filed in Japanese language on Jan. 15, 2004).

Patent Abstracts of Japan. JP 10-040187, Feb. 13, 1998 (reference previously filed in Japanese language on Jan. 15, 2004).

Patent Abstracts of Japan, JP 2002-123461, Apr. 26, 2002 (with corr. EP 1 199 865 A2 and US 2001/0045422 A1) (reference previously filed in Japanese language on Jan. 15, 2004).

Patent Abstracts of Japan, JP 2001-195335, Jul. 19, 2001 (reference previously filed in Japanese language on Jan. 15, 2004).

* cited by examiner

Fig. 4

| ID | TITLE | FORMAT | SIZE | URL | ... |
|---|---|---|---|---|---|
| 101 | TRIP | JPEG | 800×600 | URL1 | ... |
| 102 | ABC | JPEG | 800×600 | URL2 | ... |
| 103 | DEF | GIF | 800×600 | URL3 | ... |
| 104 | GHI | GIF | 800×600 | URL4 | ... |
| ... | ... | ... | ... | ... | ... |

*Fig. 8*

(a) ORIGINAL CONTENT (CONVERSION NOT REQUIRED)

| URL | CONVERSION IDENTIFICATION INFORMATION [FLAG = 0] |
|---|---|

(b) NOT ORIGINAL CONTENT (CONVERSION REQUIRED)

| VIRTUAL URL (CONVERSION INSTRUCTION INFORMATION) | CONVERSION IDENTIFICATION INFORMATION [FLAG = 1] |
|---|---|

Fig. 10

| TITLE | ARTIST NAME | ... | URL | FORMAT | ORIGINAL INFORMATION |
|---|---|---|---|---|---|
| Abc··ffg | Csde··fddd | ... | URL1 | JPEG | ☆ |
| Abc··ffg | Csde··fddd | ... | URL2 | GIF | |
| Dkk··ytr | Kfd··rtsgg | ... | URL3 | JPEG | ☆ |
| ... | ... | ... | ... | ... | ... |
| LFT··urt | Jftr··hgf | ... | URLn | JPEG | ... |

☆ : ORIGINAL

INFORMATION PROCESSING AND, CONTENT DISTRIBUTION APPARATUS METHOD, AND PROGRAM WITH CONVERSION IDENTIFICATION INFORMATION

TECHNICAL FIELD

The present invention relates to an information processing apparatus, information processing method, content distribution apparatus, content distribution method, and computer program. Further, more specifically, the present invention relates to an information processing apparatus, information processing method, content distribution apparatus, content distribution method, and computer program for enabling a configuration for executing processing for transmitting and receiving various styles of content such as, for example, content that varies with respect to file format, image size, number of colors, file size, codec method used, bit rate, file size, and audio mode etc. to transmit data in the most appropriate manner according to the client without a server maintaining a plurality of data specification content, and making it possible to confirm whether or not received data from the server is data for which conversion processing is completed.

BACKGROUND ART

As data communication networks become evermore common place, so-called "home networks" where household appliances and computers in a household are connected to other peripheral equipment using a network so as to enable communication between each item of equipment have become more widespread. Home networks provided convenience and comfort to a user by enabling the data processing functions of each item of equipment to be shared through carrying out communication between network-connected equipment, and exchanging content etc. between equipment etc., and are predicted to become even more widespread in the future.

Universal Plug and Play (UPnP) is well-known as a protocol benefiting from this kind of home network configuration. Universal Plug and Play (UPnP) enables networks to be constructed in a straightforward manner without the need for complex operations, and enables the receiving of services provided by each item of connected equipment for equipment connected to the network without necessitating complex operations or settings. UPnP has the advantages of not being dependent on the OS (operating system) on a device and can easily be added to equipment.

UPnP converts definition files conforming to XML (extensible Markup Language) between connected equipment so that equipment can recognize other equipment. An outline of UPnP processing is as follows.

(1) Addressing processing for acquiring an own-device ID such as an IP address.

(2) Discovery processing of searching for each device on the network, receiving responses from each device, and acquiring information such as device classification, and function contained in the responses.

(3) Service request processing for requesting services at each device based on information acquired in the discovery processing.

Providing and receiving of services appropriate for the equipment connected to the network is then made possible by carrying out the above processing procedure. Equipment newly connected to the network then acquires a device ID using the addressing processing and acquires information regarding other devices connected to the network using the discovery processing, with service requests then being made possible for other equipment based on the acquired information.

For example, in the case of reproducing content such as audio data or image data etc. stored at a server at a client-side device, requests to acquire attribute information for various content information stored in the server such as, for example, compressed information for songs, movie titles, artist names, or data (ATRAC: adaptive transform acoustic coding, MPEG: moving picture experts group, etc.), or copyright information when required, are sent from the client-side to the server. This attribute information is referred to as metadata or tag information.

The server sends metadata (attribute information relating to content held by the server to the client according to requests from the client. The client then displays content information at a display of a client device in accordance with a prescribed display program based on the metadata acquired from the server. For example, song lists etc. comprised of artist name and title etc. are displayed at the display. The user then confirms or selects reproduction target content based on the displayed information and sends a content transmission request to the server. The server then receives the content request from the client, transmits content to the client from the server according to requests received, and received content is reproduced on the client side.

It is therefore possible for content stored on a server within a home network to be accessed from other equipment connected to the network. For example, it is possible for content to be acquired by equipment implementing UPnP connection having the above straightforward equipment connection configuration. When the content is movie data or music data, if a TV or player etc. is connected as equipment connected to the network, it is possible to watch a mover or listen to music.

Various content such as music or image data etc. is usually transmitted and received between of the items of equipment as various forms of coded data stored in storage units of each item of equipment. For example, in the case of audio data this will be ATRAC3: adaptive transform acoustic coding3, or ATRAC3plus, and in the case of image data, this will be MPEG1: moving picture experts group 1, MPEG2, MPEG4, etc.

However, personal computers, PDAs, or mobile telephones (including PHS terminals) may be used as the client equipment. It is therefore possible that there may be differences in the specifications of the client equipment (display performance, moving picture reproduction performance, audio reproduction performance, etc.) occurring due different equipment being used, or due to a manufacturer or model number being different even when the type of equipment is the same. There may also be differences in the forms of connection to the network for the client equipment (type of line, data transfer speed of line, etc.). Differences therefore appear in content reproduction performance with respective client equipment with regards to what kind of equipment is used as the client equipment, etc.

As a result, in a related server-client system for distributing content, in order to achieve compatibility with various client equipment on the server side, pluralities of the same content in different formats for implementing conversion processing for original content are prepared at a data conversion unit of the server. Content of a format corresponding to the content reproduction performance of the client equipment is then distributed according to content requests from the client side. A method for enabling a client to perform a search in line with file attributes to acquire data is disclosed in, for example, Japanese Patent Laid-open Publication No. 2001-22625 (A method for searching in line with file attributes, and acquire data).

However, when data conversion is executed at the server, the data after conversion has deteriorated compared with the original data. The client then specifies a data specification according to functions possessed by an own-device, and makes a content request to the server. For example, when the client is capable of processing GIF and JPEG image data, image data of one of GIF or JPEG is specified, and a content transmission request is carried out. The server then sends image data that is one of GIF or JPEG to the client in accordance with requests from the client.

The client then reproduces and output content received from the server based on an own-data reproduction program. However, it is not possible on the client-side to make a determination as to whether the reproduced content is content that has undergone data conversion at the server or is original content that has not undergone data conversion. In the case of converted data, the client carries out reproduction of data that has deteriorated after conversion. A situation therefore occurs in reality where the client is forced to reproduce converted data regardless of whether reproduction processing of high quality original data is possible.

DISCLOSURE OF THE INVENTION

The present invention therefore sets out in view of the aforementioned problems of the conventional art. As described above, in the conventional configuration where a plurality of the same content is prepared in different formats in order to provide compatibility with various client equipment on the server side, and content is distributed in a format according to the content reproduction ability of the client equipment according to content requests from the client side, it is difficult to provide compatibility with, for example, a variety of client equipment newly connected to a network.

It is therefore an object of the present invention to provide an information processing apparatus, information processing method, content distribution apparatus, content distribution method, and computer program capable of distributing content appropriate according to the specification of client equipment without preparing content of a plurality of different formats etc. and different data specifications on the server side.

Further, it is an object of the present invention to provide an information processing apparatus, information processing method, content distribution apparatus, content distribution method, and computer program capable of determining, for a client receiving content from a server, whether received content is data converted by the server or is original data that has not been converted, and capable of selecting and executing reproduction of high-quality original data on a client-side.

In a first aspect of the present invention, an information processing apparatus for executing content information transmission processing is characterized by comprising:

a storage unit for storing content;

a request processing unit for receiving a content data list request storing reproduction specification information from a client, and acquiring address information indicating the whereabouts of content stored in the storage unit based on the content data list request;

a data conversion confirmation unit for determining whether or not reproduction specification information contained in the content data list request and a content specification stored in the storage unit match, and when not matching, determining whether or not it is possible to cause matching with a client-specified reproduction specification by data conversion processing of stored content at a content distribution apparatuses, and generating a data conversion mode required by the stored content to enable matching with a client-specified reproduction specification as data conversion specifying information using data conversion; and an address processing unit for generating virtual address information embedded with the data conversion specifying information at address information of content capable of being made to match with a client-specified reproduction specification by data conversion processing based on determination results of the data conversion confirmation unit, wherein the request processing unit has a configuration for generating an address information list containing address information for the stored content of the storage unit matching with the client-specified reproduction specification information and virtual address information embedded with the data conversion specifying information at the address information of content capable of being made to match with the client-specified reproduction specification using data conversion processing, and executing processing for transmitting to the client.

In an embodiment of an information processing apparatus of the present invention, it is characterized that the data conversion confirmation unit has a conversion information identification unit for setting conversion identification information as to whether stored content of the storage unit is content that does not require data conversion in order to match with the client-specified reproduction specification or is content requiring data conversion, and the request processing unit has a configuration for generating an address information list, containing combined data of address information for stored content of the storage unit matching with the client-specified reproduction specification information and conversion identification information indicating the presence of content not requiring data conversion, and combined data of virtual address information embedding the data conversion specifying information at address information for content that can be made to match with the client-specified reproduction specification by data conversion processing and conversion identification information indicating the presence of content requiring data conversion, as transmission information for the client.

In one embodiment of an information processing apparatus of the present invention, it is characterized that the reproduction specification information contains information for one of file format, data size, number of colors, file size, codec method, bit rate, file size, and audio mode, and the data conversion confirmation unit has a configuration for executing processing to determine whether or not content is present requiring data conversion processing for making stored content of the storage unit match with at least one of the reproduction specifications of the file format, image size, number of colors, file size, codec format, bit rate, file size, and audio mode specified by the client.

In one embodiment of an information processing apparatus of the present invention, it is characterized that the address information is URL (Uniform Resource Locators) set corresponding to each content.

In a second aspect of the present invention, an information processing apparatus is for making content transmission requests to a content providing server, and is characterized by a configuration comprising a data transceiver unit for executing processing for transmitting and receiving data to and from the content providing server, a control unit for display information for displaying at an output unit based on content information received from the server via the data transceiver unit, and a display unit for outputting and displaying display information generated by the control unit, wherein the control unit executes processing generating display information enabling identification as to whether or not content capable of being transmitted by the server is content requiring data conversion processing occurring at the server based on conversion identification information contained in content information received from the server.

In a third aspect of the present invention, an information processing apparatus for making content transmission requests to a content providing server, characterized by a configuration comprising:

a data transceiver unit for executing processing for transmitting and receiving data to and from the content providing server, and a control unit for preferentially selecting content not requiring data conversion processing at the server as transmission request content for the server based on conversion identification information contained in content information received from the server via the data transceiver unit, and executes transmission requests for the selected content.

In a fourth aspect of the present invention, there is provided a content distribution system characterized by comprising a server for executing content information transmission processing, and a client for making content transmission requests to the server, the server comprising a storage unit for storing content;

a data conversion confirmation unit for determining whether or not reproduction specification information contained in the content data list request and a content specification stored in the storage unit match, and when not matching, determining whether or not it is possible to cause matching with a client-specified reproduction specification by data conversion processing of stored content at a content distribution apparatuses, and generating a data conversion mode required by the stored content to enable matching with a client-specified reproduction specification as data conversion specifying information using data conversion;

an address processing unit for generating virtual address information embedded with the data conversion specifying information at address information of content capable of being made to match with a client-specified reproduction specification by data conversion processing based on determination results of the data conversion confirmation unit; and a request processing unit for receiving a content data list request storing reproduction specification information from a client, and acquiring address information indicating the whereabouts of content stored in the storage unit based on the content data list request, and generating an address information list containing address information for the stored content of the storage unit matching with the client-specified reproduction specification information and virtual address information embedded with the data conversion specifying information at the address information of content capable of being made to match with the client-specified reproduction specification using data conversion processing, and executing processing for transmitting to the client;

and the client comprises a data transceiver unit for executing processing for transmitting and receiving data to and from the content providing server;

a control unit for display information for displaying at the output unit based on content information received from the server via the data transceiver unit, and executes processing generating display information enabling identification as to whether or not content capable of being transmitted by the server is content requiring data conversion processing occurring at the server based on conversion identification information contained in content information; and a display unit for outputting and displaying display information generated by the control unit.

In an embodiment of a content distribution system of the present invention, it is characterized in that the data conversion confirmation unit of the server has a conversion information identification unit for setting conversion identification information as to whether stored content of the storage unit is content that does not require data conversion in order to match with the client-specified reproduction specification or is content requiring data conversion, and the request processing unit has a configuration for generating an address information list, containing combined data of address information for stored content of the storage unit matching with the client-specified reproduction specification information and conversion identification information indicating the presence of content not requiring data conversion, and combined data of virtual address information embedding the data conversion specifying information at address information for content that can be made to match with the client-specified reproduction specification by data conversion processing and conversion identification information indicating the presence of content requiring data conversion, as transmission information for the client.

Further, in an embodiment of a content distribution system of the present invention, it is characterized in that the client further comprises a data transceiver unit for executing processing for transmitting and receiving data to and from the server, and a control unit for preferentially selecting content not requiring data conversion processing at the server as transmission request content for the server based on conversion identification information contained in content information received from the server via the data transceiver unit, and executes transmission requests for the selected content.

In a fifth aspect of the present invention, an information processing method for executing content information transmission processing, and is characterized by comprising:

a step of receiving a content data list request storing reproduction specification information from a client;

an address information acquisition step of acquiring address information indicating the whereabouts of content stored in a storage unit based on the content data list request;

a data conversion confirmation step of determining whether or not reproduction specification information contained in the content data list request and a content specification stored in the storage unit match, and when not matching, determining whether or not it is possible to cause matching with a client-specified reproduction specification by data conversion processing of stored content at a content distribution apparatuses, and generating a data conversion mode required by the stored content to enable matching with a client-specified reproduction specification as data conversion specifying information using data conversion;

an address processing step for generating virtual address information embedded with the data conversion specifying information at address information of content capable of being made to match with a client-specified reproduction specification by data conversion processing based on determination results of the data conversion confirmation step; and an address information list generation/transmission step of generating an address information list containing address information for the stored content of the storage unit matching with the client-specified reproduction specification information and virtual address information embedded with the data conversion specifying information at the address information of content capable of being made to match with the client-specified reproduction specification using data conversion processing, and transmitting to the client.

In an embodiment of an information processing method of the present invention, it is characterized in that the information processing method further comprises a conversion identification information setting step of setting conversion identification information as to whether stored content of the storage unit is content that does not require data conversion in order to match with the client-specified reproduction specification or is content requiring data conversion, and the address information list generation/transmission step is generates an address information list, containing combined data of address information for stored content of the storage unit matching with the client-specified reproduction specification information and conversion identification information indicating the presence of content not requiring data conversion, and combined data of virtual address information embedding the data conversion specifying information at address information for content that can be made to match with the client-specified reproduction specification by data conversion processing and conversion identification information indicating the presence of content requiring data conversion, as transmission information for the client.

In one embodiment of an information processing method of the present invention, it is characterized in that the reproduction specification information contains information for one of file format, data size, number of colors, file size, codec method, bit rate, file size, and audio mode, and the data conversion confirmation step executes processing to determine whether or not content is present requiring data conversion processing for making stored content of the storage unit match with at least one of the reproduction specifications of the file format, image size, number of colors, file size, codec format, bit rate, file size, and audio mode specified by the client.

In one embodiment of an information processing method of the present invention, it is characterized in that the address information is URL (Uniform Resource Locators) set corresponding to each content.

In a sixth aspect of the present invention, an information processing method for executing content information displaying processing characterized by comprising:

a step of receiving content information from a content providing server;

a display information generating step of generating display information enabling identification as to whether or not content capable of being transmitted by the server is content requiring data conversion processing occurring at the server based on conversion identification information contained in received content information; and a step of displaying display information generated in the display information generating step.

In a seventh aspect of the present invention, an information processing method for executing processing deciding request content based on content information, characterized by comprising:

a step of receiving content information from a content providing server;

a selection step of preferentially selecting content not requiring data conversion processing at the server as transmission request content for the server based on conversion identification information contained in received content information; and a step of transmitting identification information for transmission request content decided in the selection step to the content providing server.

In an eighth aspect of the present invention, a computer program for executing content information transmission processing is characterized by comprising:

a step of receiving a content data list request storing reproduction specification information from a client;

an address information acquisition step of acquiring address information indicating the whereabouts of content stored in a storage unit based on the content data list request;

a data conversion confirmation step of determining whether or not reproduction specification information contained in the content data list request and a content specification stored in the storage unit match, and when not matching, determining whether or not it is possible to cause matching with a client-specified reproduction specification by data conversion processing of stored content at a content distribution apparatuses, and generating a data conversion mode required by the stored content to enable matching with a client-specified reproduction specification as data conversion specifying information using data conversion;

an address processing step for generating virtual address information embedded with the data conversion specifying information at address information of content capable of being made to match with a client-specified reproduction specification by data conversion processing based on determination results of the data conversion confirmation step; and an address information list generation/transmission step of generating an address information list containing address information for the stored content of the storage unit matching with the client-specified reproduction specification information and virtual address information embedded with the data conversion specifying information at the address information of content capable of being made to match with the client-specified reproduction specification using data conversion processing, and transmitting to the client.

In an ninth aspect of the present invention, a computer program for executing content information displaying processing is characterized by comprising:

a step of receiving content information from a content providing server;

a display information generating step of generating display information enabling identification as to whether or not content capable of being transmitted by the server is content requiring data conversion processing occurring at the server based on conversion identification information contained in received content information; and a step of displaying display information generated in the display information generating step.

In a tenth aspect of the present invention, a computer program for executing processing deciding request content based on content information is characterized by comprising:

a step of receiving content information from a content providing server;

a selection step of selecting content not requiring data conversion processing at the server as transmission request content for the server based on conversion identification information contained in received content information; and a step of transmitting identification information for transmission request content decided in the selection step to the content providing server.

In an eleventh aspect of the present invention, a content distribution apparatus is characterized by having: content storage means for storing a plurality of content; data list request receiving means for receiving data list requests designated by the content reproduction specification from the client equipment; address information acquisition means for acquiring address information indicating the whereabouts of corresponding content from the content storage means based on the content reproduction specification of the data list request received by the data list request receiving means; data conversion determination means for determining whether or not data conversion is necessary for content acquired using the address information by the address information acquisition means based on the content reproduction specification of the data list request; address information conversion means for embedding data conversion specifying information in address information for content acquired by the address information acquisition means when it is determined that data conversion is necessary by the data conversion determination means; address information returning means for returning address information for content acquired by the address information acquisition means and address information converted by the address information conversion means to the client equipment; address information receiving means for receiving the address information from the client equipment; analysis means for analyzing the address information received by the address information receiving means; content acquisition means for acquiring corresponding content from the content storage means based on address information from the client equipment; data conversion means for subjecting content acquired by the content acquisition means to data conversion based on the data conversion specifying information when analysis by the analysis means indicates that data conversion specifying information is embedded in address information from the client equipment; and content transmission means for transmitting content acquired by the content acquisition means or content data converted by the data conversion means to the client equipment.

In a twelfth aspect of the present invention, a content distribution method is characterized by: receiving data list requests designated by the content reproduction specification from the client equipment; acquiring address information indicating the whereabouts of corresponding content based on the content reproduction specification of the data list request; determining whether or not data conversion is necessary for content acquired by the address information based on the content reproduction specification of the data list request; embedding data conversion specifying information in the acquired address information when it is determined that data conversion is necessary; returning the acquired address information or the converted address information to the client equipment; receiving address information from the client equipment; acquiring the corresponding content based on the received address information; analyzing address information from the client equipment; subjecting the acquired content to data conversion based on the data conversion specifying information when it is analyzed that data conversion specifying information is embedded; and sending the acquired content or the data-converted content to the client equipment.

In a thirteenth aspect of the present invention, a computer program is characterized by causing a computer to execute: a step of receiving data list requests designated by the content reproduction specification from the client equipment; a step of acquiring address information indicating the whereabouts of corresponding content based on the content reproduction specification of the data list request; a step of determining whether or not data conversion is necessary for content acquired by the address information based on the content reproduction specification of the data list request; a step of embedding data conversion specifying information in the acquired address information when it is determined that the data conversion is necessary; a step of returning the acquired address information or the converted address information to the client equipment; a step of receiving address information from the client equipment; a step of acquiring the corresponding content based on the received address information; a step of analyzing address information from the client equipment; a step of subjecting the acquired content to data conversion based on the data conversion specifying information when it is analyzed that the data conversion specifying information is embedded; and a step of sending the acquired content or the data-converted content to the client equipment.

In a fourteenth aspect of the present invention, a computer program is characterized by causing a computer to execute: a step of receiving data list requests designated by the content reproduction specification from the client equipment; a step of acquiring address information indicating the whereabouts of corresponding content based on the content reproduction specification of the data list request; a step of determining whether or not data conversion is necessary for content acquired by the address information based on the content reproduction specification of the data list request; a step of embedding data conversion specifying information in the acquired address information when it is determined that the data conversion is necessary; and a step of returning the acquired address information or the converted address information to the client equipment.

According to the configuration of the present invention, at the server for executing content information transmission processing, a configuration is adopted in such a way that the address information containing content address information matching with reproduction specification information specified by the client and virtual address information embedding data conversion specifying information in address information for content capable of being made to match with a reproduction specification specified by the client using data conversion processing is generated based on receipt of a content data list request storing reproduction specification information from a client and sent to the client, and a configuration is adopted in such a way that the data conversion information is acquired from the virtual address information based on the content request stored in address information from the client, necessary data conversion is executed, and is sent to the client. Accordingly, on the server side, it is not necessary to hold content of different specifications corresponding to various clients, and transmission of content compatible with the client can be effectively implemented by performing accurate data conversion according to the client specification in accordance with requests from the client.

Further, according to the configuration of the present invention, the conversion identification information taken as information for identifying whether content for the server is content matching with the client specified reproduction specification that does not require data conversion or content requiring data conversion is sent to the client. The client is then capable of selecting content for reproduction giving priority to original content for which the possibility of data deterioration is low, so as to enable high-quality reproduction to be carried out.

Further, according to the configuration of the present invention, the content storage means for storing a plurality of content is prepared, address information indicating the whereabouts of corresponding content from the content storage means is acquired by the address information acquisition means based on the content reproduction specification of the data list request received by the data list request receiving means, whether or not data conversion is necessary for content acquired using the address information by the address information acquisition means is determined based on the content reproduction specification of the data list request by the data conversion determination means, data conversion specifying information is embedded in the acquired address information by the address information acquisition means when it is determined that data conversion is necessary by the data conversion determination means, address information for the acquired content or the converted address information is returned to the client equipment by the address information returning means, the address information is received from the client equipment by the address information receiving means, corresponding content is acquired from the content storage means based on address information from the client equipment by the content acquisition means, the received address information is analyzed by the analysis means, content acquired by the content acquisition means is data converted by the data conversion means based on the data conversion specifying information when it is analyzed that data conversion specifying information is embedded in address information from the client equipment, and the obtained content or the data-converted content is sent to the client equipment by the content transmission means. It is therefore possible to distribute appropriate content according to specifications of client equipment without preparing content of a plurality of formats.

The computer program of the present invention is, for a example, a computer program capable of being provided to a general purpose computer system capable of executing various types of program code in the form of a storage medium or communication medium provided in a computer-readable format, such as, for example, a storage medium such as compact disc (CD), flexible disk, magneto-optical disc (MO) etc., or a communication media such as a network etc. Processing corresponding to the program can then be implemented on a computer system as a result of providing the program in a computer-readable format.

Still further other objects, features, and advantages of the present invention will become clear as a result of a more detailed description given below based on embodiments of the present invention and the attached drawings. The system in this specification is configured from a plurality of apparatuses in a logically collected structure, and is by no means limited to each device of the configuration being in the same box.

BRIEF DESCRIPTION OF DRAWINGS

FIG. 4 is an outline view showing an example data configuration for a content database 303.

FIG. 8 is a view illustrating an example configuration for URL list transmission data set in conversion identification information.

FIG. 10 is a view showing an example of display information displayed at a client based on URL list information sent from a server to a client.

BEST MODE FOR CARRYING OUT THE INVENTION

The following is a detailed description with reference to the drawings of an information processing apparatus, information processing method, content distribution apparatus, content distribution method, and computer program of the present invention.

{System Outline}

Figure 1:
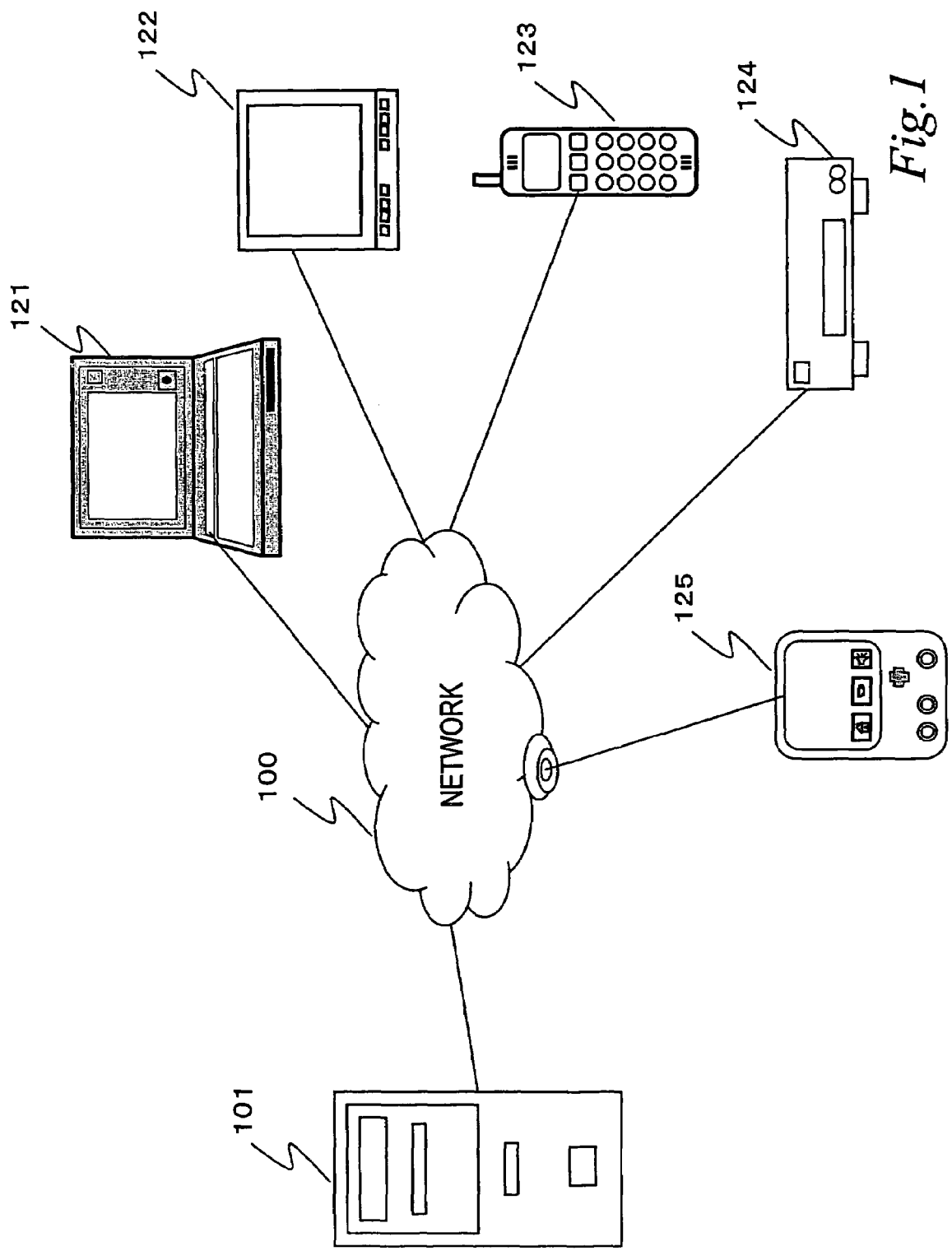
FIG. 1 is a view showing an example network configuration to which the present invention can be applied.

First, a description is given with reference to FIG. 1 of an example of a network configuration to which the present invention can be applied. FIG. 1 shows, for example, a configuration for a home network configured by connecting a server 101 for executing processing according to processing requests from various client equipment, a PC 121 serving as a client equipment for performing processing requests with respect to the server 101, a monitor 122, a mobile telephone 123, a reproducer 124, and a PDA 125 via a network 100. Various other electronic equipment and household equipment can also be connected as client equipment.

Processing executed by the server 101 according to requests from a client may be, for example, the providing of content stored in storage means such as a hard disc etc. held by the server 101, or data processing services resulting from execution of application programs the server is capable of executing, etc. In FIG. 1, the server 101 and the client equipment are shown in a discriminating manner. However, equipment providing services regarding requests from a client are shown to be servers, and any client equipment that is capable of providing functions as a server when providing its own data processing services to other clients. It is therefore possible for the client equipment connected to the network shown in FIG. 1 to act as servers.

The network 100 may be either of a wired or wireless network etc., with each connected item of equipment transmitting and receiving signals via the network 100 as, for example, communication packets of Ethernet (registered trademark) frames, etc. Namely, a client executes data processing requests with respect to the server 101 by transmitting frames storing processing request information at an Ethernet frame data section to the server 101. The server 101 executes data processing according to received processing request frames and stores result data in a communication packet data section for transmission to each client as data processing results as necessary.

The network-connected equipment is configured from, for example, universal plug and play (UPnP: Universal Plug and Play) compatible equipment. This configuration therefore makes addition and removal of connected equipment to and from the network straightforward. Equipment newly connected to a network performs the following processing:

(1) Addressing processing for acquiring an own-device ID such as an IP address.

(2) Discovery processing of searching for each device on the network, receiving responses from each device, and acquiring information such as device classification, and function contained in the responses.

(3) Service request processing for requesting services at each device based on information acquired in the discovery processing.

Receiving of services appropriate for the equipment connected to the network is made possible by carrying out the above processing procedure.

The server possesses attribute information corresponding to respective content such as image data for still images or moving images etc. or audio data etc. stored in its own storage unit as metadata. Various information such as a URLs (Uniform Resource Locators) constituting information regarding the whereabouts of content, identifiers (ID), data specifications, data sizes, resource information, titles, artist names, and copyright information etc. is contained in the metadata constituting content attribute information. Individual information contained in the metadata is referred to as property. What kind of data is constituted of what kind of properties is defined in advance for each category such as Audio, Video, and Photo etc. The server provided content information according to acquisition requests for content information from a client. The client selects content to be reproduced in accordance with content information received from the server, and transmits requests for content to the server. The details of this processing are described in the following.

Figure 2:
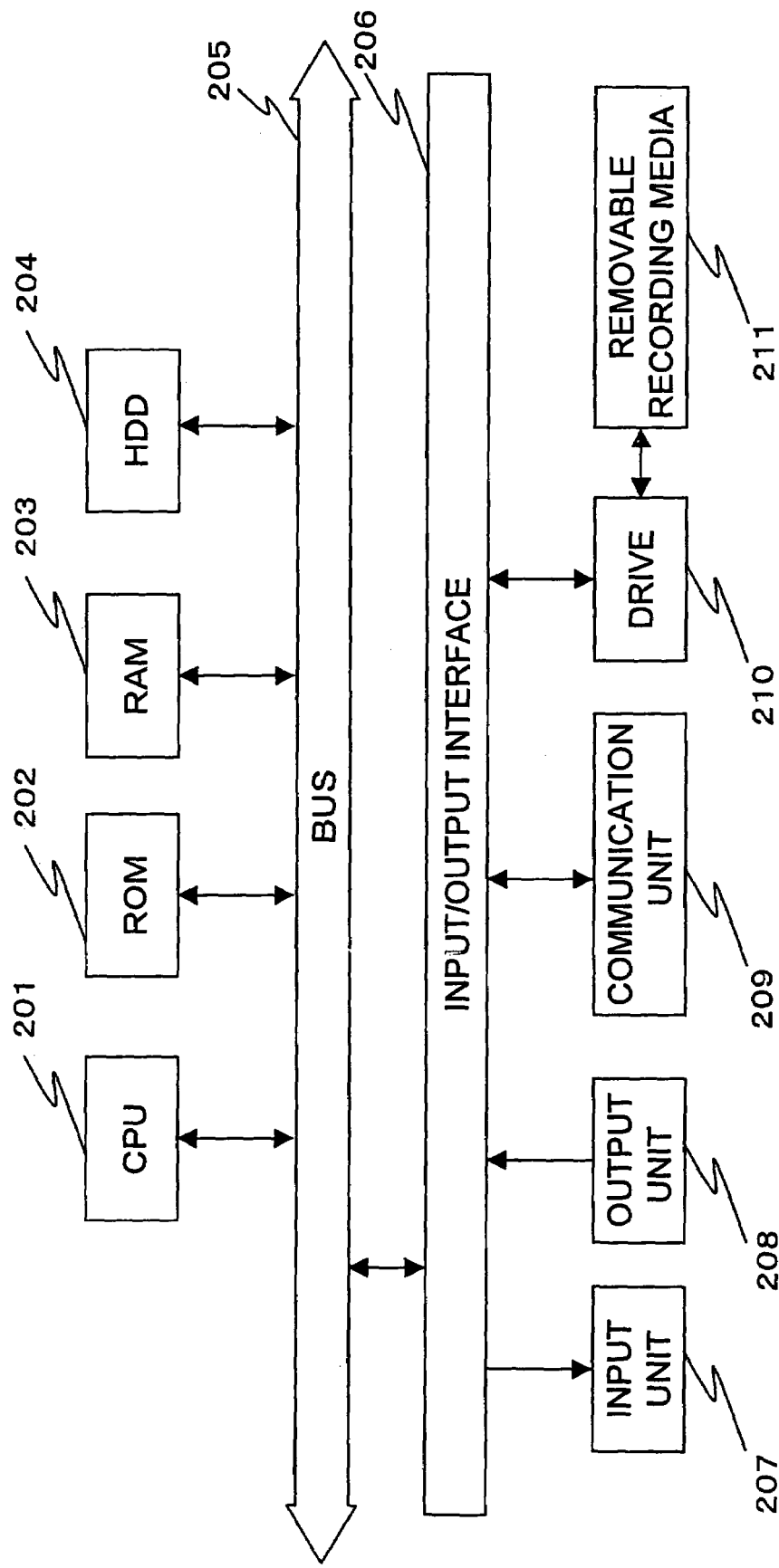
FIG. 2 is a view illustrating an example configuration for equipment connected to a network.

Next, a description is given with reference to FIG. 2 of an example of a hardware configuration for a PC taken as an example of an information processing apparatus constituted by the server and client equipment shown in FIG. 1.

A CPU (Central Processing Unit) 201 functions as data processing means or communication control processing means for executing various processing in accordance with a program stored in ROM (Read Only Memory) 202 or in HDD 204 etc. Programs and data executed by the CPU 201 are stored in the RAM 203 whenever necessary. The CPU 201, ROM 202, RAM 203, and HDD 204 are connected to each other via a bus 205.

An input/output interface 206 is connected to the bus 205. An input unit 207 configured from a keyboard, switch, button or mouse etc. operated by a user, and an output unit 208 configured from an LCD, CRT and speaker etc. for presenting various types of information to a user, for example, are connected to the input/output interface 206. A communication unit 209 functioning as data transceiver means, and a drive 210, capable of being fitted with removable recording media 211 such as a magnetic disc, optical disc, magneto-optical disc, or semiconductor memory, for executing processing for reading data from or writing data to the removable recording media 211, are also connected.

In the configuration shown in FIG. 2, an example of a personal computer (PC) is given as a server taken as an example of the network-connected equipment shown in FIG. 1, but network-connected equipment is by no means limited to a PC, and may also be configured from mobile communication terminals such as the mobile telephones or PDAs etc. shown in FIG. 1, or others such as reproduction apparatuses, various electronic equipment such as displays etc., or information processing apparatuses. It is therefore also possible to have hardware configurations peculiar to the respective equipment, with processing then being executed in accordance with this hardware.

{Content Reproduction Processing by the Client}

For example, a client intending to reproduce content can then make a content request to the server, receive the requested content from the server, and then reproduce the content. Typically, the procedure for reproducing content is as shown below.

(1) A client makes a request to acquire content information held on a server.

(2) The server then generates content specifying information (for example, content URLs) and content information such as titles and artist names etc. using, for example, XML (eXtended Markup Language) based on metadata corresponding to content in accordance with requests from the client and sends this to the client.

(3) The client displays a content list on a display in accordance with received content information. For example, in the case of music content, a list comprised of song names, artist names and reproduction time etc. corresponding to a plurality of music held on the server is displayed.

(4) The client then selects content to be received and reproduced from the server at the client equipment and sends content specifying information (for example, content URLs) to the server. This is executed, for example, as HTTP (Hyper Text Transfer Protocol) GET method request transmission processing.

(5) The server then acquires content from storage means based on received content specifying information and transmits this information.

(6) The client then carries out received content reproduction processing.

A usual content reproduction procedure is as described above. The client can acquire various content attribute information, i.e. property information contained in metadata corresponding to content held on the server, as necessary.

{Content Distribution Involving Data Conversion Necessity Determination Occurring and Conversion Processing Occurring at the Server}

Various client equipment is connected to the network, with the forms of content data that each item of equipment is capable of reproducing being respectively different. As described in the section of the conventional art, in the conventional art, a construction is adopted where data converted to a data specification a client is capable of processing is stored by the server in a storage unit, and data selected according to the client is transmitted.

With the configuration of the present invention, the server executing processing for providing content to the client stores data with one data specification for original content. There are also cases where original content is held using a plurality of different types of data specification when a plurality of data specifications are acquired as original data. The server data converts original content when necessary in accordance with content requests from the client and transmits this data to the client. Accordingly, management of converted data for various data specifications (GIF, JPEG, MPEG, ATRAC3, ATRAC3plus, etc.) converted by the server for one item of content is not carried out by the server.

Figure 3:
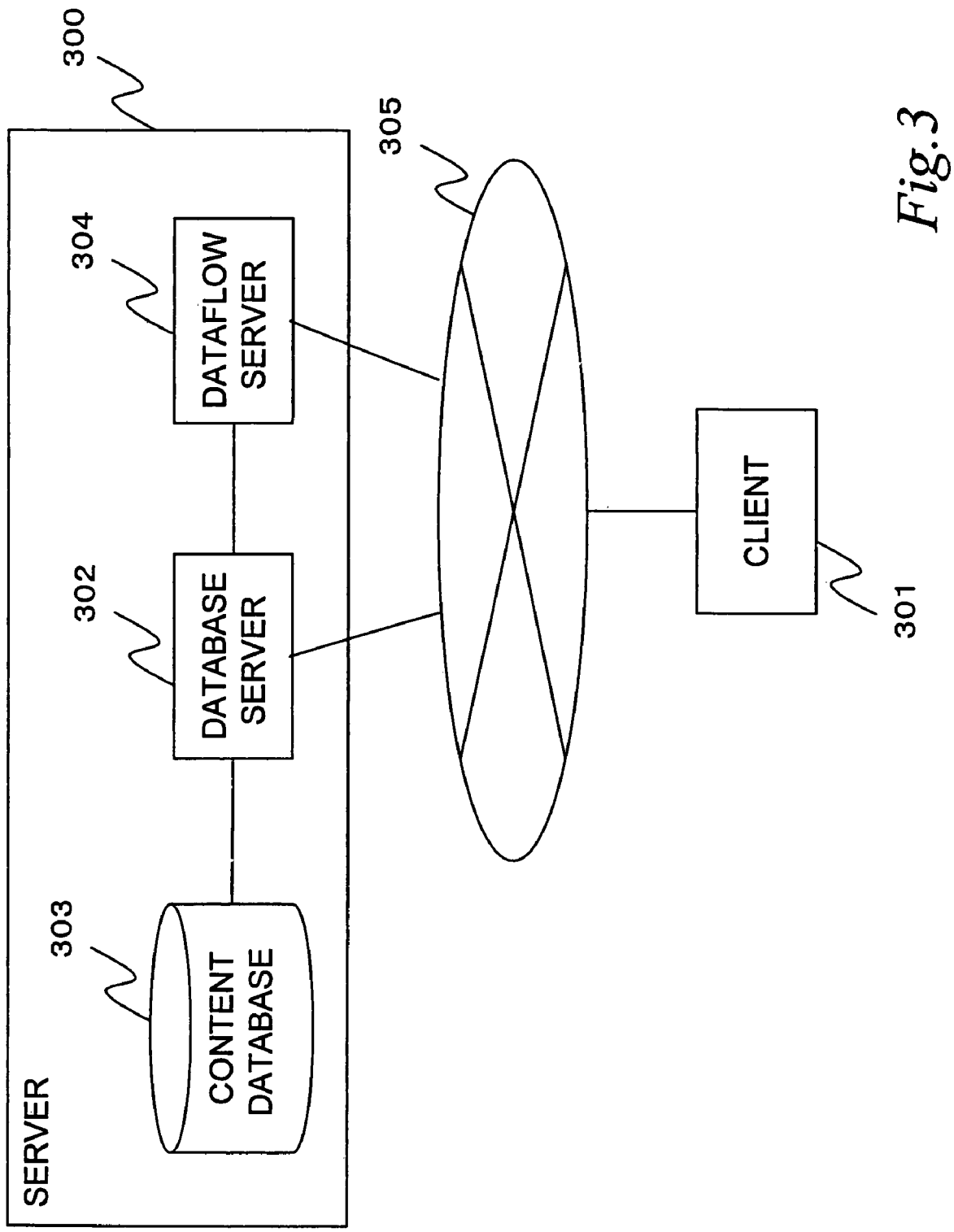
FIG. 3 is a block diagram showing a configuration for a data distribution system of an embodiment of the present invention.

FIG. 3 is a block diagram showing an example of a minimum configuration of a server 300 and a client 301 constituting a content distribution system. The server 300 is configured from a content database 303 storing content and content metadata, a database server 302 for executing processing to extract content information corresponding to requests from the client from metadata stored in the content database 303 and sending this information to the client, and a dataflow server 304 for executing processing to extract content corresponding to requests from the client from the content database 303 and sending this content to the client.

The database server 302, content database 303, and dataflow server 304 that are the structural elements of the server 300 may be configured to be set within a single item of equipment such as, for example, a single PC, or may be configured as individual apparatuses capable of mutual communication.

The client equipment 301 is comprised of equipment such as personal computers, PDAs, or mobile telephones (including PHS terminals), and transmits data list requests to the database server 302 via the network 305. A content reproduction specification indicating content reproduction ability at the client equipment 301 is specified in the data list request.

File format (JPEG, BMP, GIF, PNG, etc.), image size (vertical×horizontal pixels), number of colors and file size can be considered as content reproduction specification when, for example, the desired content is image (still image) data. File format (MPEG1, MPEG2, AVI, WMV, etc.), codec method, and bit rate etc. can be considered when the desired content is moving image data. Moreover, file format (MP3, WAV, etc.), bit rate, and stereo/mono etc. can be considered when the desired content is audio data.

For example, when a mobile telephone is used as client equipment 301, when a list for a wait screen is requested, the displaying ability with a mobile telephone is limited and, for example, displayable file format (for example, JPEG), image size (for example, 150×100 pixels), number of colors (256), and file size (2 Kbytes) etc. may be specified as data attributes.

Further, as described in the following, the client equipment 301 receives a URL list (Uniform Resource Locators; a list of address information indicating the whereabouts of content) for corresponding content returned from the database server 302. A URL for the desired content is then selected and specified from the content URL list, and the desired content can finally be received. URLs for content matching with the content reproduction specification, i.e. URLs for content capable of being reproduced without carrying out any kind of data conversion on the side of the client equipment 301, and URLs that are capable of being subjected to data conversion in order to match with a content reproduction specification at the dataflow server 304 described later are contained in the content URL list.

Further, when a URL for desired content is selected for designation from a content URL list by the client equipment 301, the URL for the selected specified content is passed over to the dataflow server 304.

Content identification information such as a data name (file name) uniquely specifying the content or a title etc. may be contained at in the data list request. In this case, a URL of content uniquely specified by the content identification information may be sent from the database server 302 described later to the client equipment 301.

Further, when a URL for desired content is selected for designation from a content URL list by the client equipment 301, the URL for the selected specified content is passed over to the dataflow server 304.

When there is a data list request from the client equipment 301 via the network 305, the database server 302 analyzes the data list request and returns a content URL list on the content database 303 to the client equipment 301. As described above, URLs for content matching with the content reproduction specification and URLs for content capable of being data-converted so as to match with the content reproduction specification at the dataflow server 304 as described later are contained in the content URL list.

At this time, the actual URL for the content is returned from the database server 302 to the client equipment in the case of content having data attributes matching with the content reproduction specification of the data list request. On the other hand, a virtual URL is returned to the client equipment from the database server 302 in the case of content that does not match with the content reproduction specification that is content capable of data conversion at the dataflow server 304 described later. Preceding the sending of content to the client equipment 301 at the dataflow server 304 described later, data conversion specifying information indicating data conversion content to be implemented for the content is contained in the virtual URL. The data conversion specifying information cannot be identified from the client equipment 301.

For example, in the event that a file format "GIF" is specified by the data list request from the client equipment 301, an actual URL for GIF format content (images) present in the content database 303 and a virtual URL embedded with "JPEG-GIF" conversion specifying information as data conversion specifying information at a URL for content (images) of another file format (JPEG etc.) is returned from the database server 302 to the client equipment 301.

Further, in the event that an image of size "150×100" is specified by the data list request from the client equipment 301, an actual URL for content of a size of "150×100" present in the content database 303 and a virtual URL embedded with "800×600"-"150×100" conversion specifying information as data conversion specifying information at a URL for "800×600" image data of different sizes is returned from the database server 302 to the client equipment 301.

Further, when a format of "GIF" and size of "150×100" is specified by the data list request from the client equipment 301, an actual URL for content (images) of the "GIF" format of sizes of "150×100" existing in the content database 303, a virtual URL with "JPEG-GIF" conversion specifying information embedded in a URL for image data of a different format "JPEG", and a virtual URL embedded with "800×600"-"150×100" conversion specifying information in a URL for image data of a different size "800×600" is returned from the database server 302 to the client equipment 301.

Further, when not only the format and size, but also the title, is specified, when image data specified uniquely by the title requires data conversion, a virtual URL with data conversion specifying information embedded in the image data URL is returned to the client equipment 301 from the database server 302, and when data conversion is not required, the image data URL itself is returned.

In the case of content that does not match with the content reproduction specification on the content database 303 and for which data conversion at the dataflow server 304 described later is not possible, a URL for the content is not returned to the client equipment 301.

Accordingly, when a URL is returned from the database server 302, the client equipment 301 is capable of accessing, acquiring and reproducing data.

Metadata for a plurality of content and information relating to the plurality of content, i.e. content attribute information is accumulated in the content database 303. Each stored content is basically stored as original content. Original content is data the server acquires from outside, such as, for example, from broadcasts, networks, or recording media such as DVD or CD etc., and is data which has not been subjected to conversion processing by data conversion means such as encoding/decoding means within the server.

The server therefore does not possess a plurality of data specifications corresponding with various client equipment such as a plurality of data specifications with differing file formats, image sizes, numbers of colors, file size, codec methods, bit rates, files sizes, or audio modes etc., but rather simply stores content for one type of data specification for one item of content. In other words, converted data generated through conversion is not stored at the server, with original content only being stored. However, when data of a plurality of different specifications is input to the server as original content, there are also cases where a plurality of original content data for different data specifications is held.

FIG. 4 is an outline view showing an example data configuration for information relating to content of the content database 303. The example in the drawing shows the case where image data is taken to be the content. An ID for identifying the image data, title (file name), file format, size, number of colors, file size, and URL etc. are stored as information relating to the image data.

Figure 5:
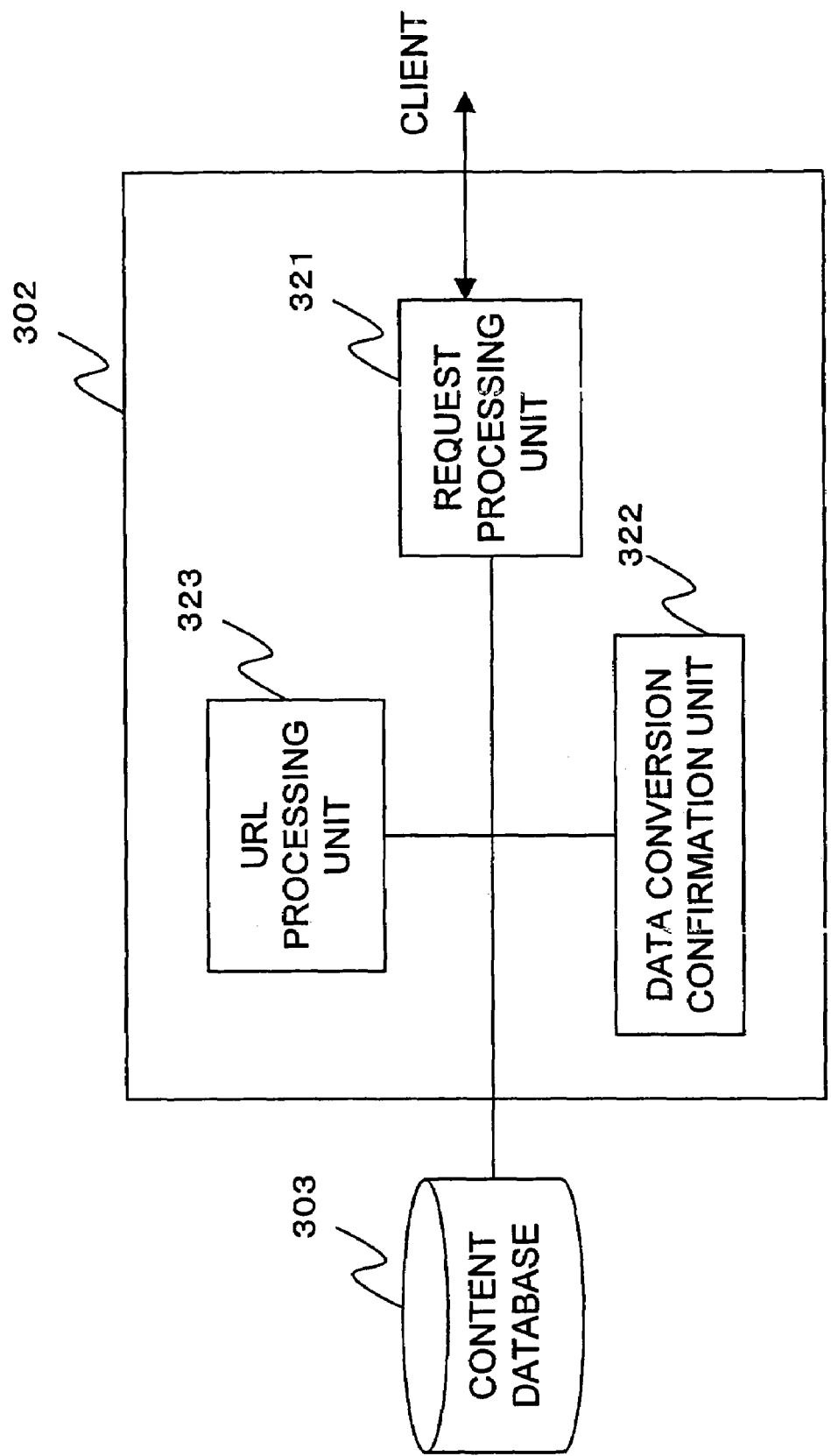
FIG. 5 is a block diagram showing a configuration for a database server 302.

FIG. 5 is a block diagram showing a configuration for a database server 302. The database server 302 is comprised of a request processing unit 321, data conversion confirmation unit 322, and URL processing unit 323. The request processing unit 321 receives a data list request from the client equipment 301, acquires URLs for content matching with the content reproduction specification of the data list request from the content database 303 and URLs for content convertible to a data specification matching with the content reproduction specification requested by the client using data conversion occurring at the dataflow server 304 described later, and passes these over to the URL processing unit 323. The request processing unit 321 executes processing to transmit URL lists for content generated by processing of the URL processing unit 323 to the client equipment 301.

The data conversion confirmation unit 322 takes data list requests as input from the client equipment 301 via the request processing unit 321, analyzes content reproduction specifications designated for the client contained in the data list request, confirms whether data conversion is necessary for content on the content database 303, and when data conversion is necessary, notifies the URL processing unit 323 as to what kind of data conversion is required. The URL processing unit 323, in accordance with notification from the data conversion confirmation unit 322, embeds data conversion specifying information in the URLs indicating the whereabouts of the content and provides this to the request processing unit 321.

The request processing unit 321 sends URL lists generated by the above processing to the client equipment 301. The URL list is data storing URLs as content access information. In the case of content matching with the content reproduction specification specified by the client, URLs taken as this access information are set. In the case where there is not matching with the content reproduction specification specified by the client but the content is such that conversion to data matching with the reproduction specification using the data conversion occurring at the dataflow server 304 is possible, the URL list is data where a virtual URL embedded with data conversion specifying information is set in the URL.

When URL list data is received from the database server 302, the client equipment 301 displays a URL list at the display. As well as the content URLs, content titles and other content information is contained in the URL table data sent from the database server 302, with these items of information being displayed at the display as a list. The user then decides upon content to be reproduced according to the displayed list, and sends the URL of the decided information to the dataflow server 304. This is executed, for example, as HTTP (Hyper Text Transfer Protocol) GET method request transmission processing specifying a URL.

The URL sent to the dataflow server 304 from the client may be one of a URL not embedded with data conversion specifying information, or a URL (virtual URL) that is embedded with data conversion specifying information.

The dataflow server 304 analyzes URLs received from the client equipment 301, and if data conversion specifying information is not included, corresponding content is acquired from the location (content storage position of the content database 303) specified by the URL and is sent to the client equipment 301. On the other hand, if data conversion specifying information is included, content is acquired from the location (content storage position of the content database 303) specified by the URL, and after executing data conversion in accordance with data conversion specifying information, the content after being converted is sent to the client equipment 301.

A configuration of the dataflow server 304 is now described with reference to FIG. 6. At the dataflow server 304, the request processing unit 341 receives URLs from the client equipment 301 and returns content specified by the URLs to the client equipment 301. The content may be unconverted original content, or content converted at the dataflow server 304.

The URL analyzing unit 342 analyzes URLs provided from the request processing unit 341 and when a URL is a virtual URL containing data conversion specifying information, data conversion specifying information contained in the virtual URL is provided to the data conversion unit 344. The data acquisition unit 343 acquires corresponding content from the content database 303 in accordance with URLs received from the client equipment 301 and passes this over to the data conversion unit 344.

If data conversion specifying information is not provided from the URL analyzing unit 342, the data conversion unit 344 provides content passed from the data acquisition unit 343 as is to the request processing unit 341. If data conversion specifying information is provided, after content passed from the data acquiring unit 343 is data-converted in accordance with the data conversion specifying information, the content is provided to the request processing unit 341. There are various kinds of data conversion such as format conversion, size conversion, or color number conversion, etc., but in any case, conversion using a well-known method is possible. For example, in the case of size conversion, it is preferable to adopt a method such as a method (interpolation) where the number of pixels is doubled from one dot to two dots, or a method (thinning out) where the number of pixels is halved from two dots to one dot.

In the above processing, the client equipment 301 receives content specified by the URL from the dataflow server 304. The received content may be unconverted original content, or content converted at the dataflow server 304. In any of these cases, the content is content matching with the content reproduction specification contained in the data list request transmitted by the client equipment 301 to the database server 302 that is capable of being replayed at the client equipment.

{Operating Sequence}

Figure 7:
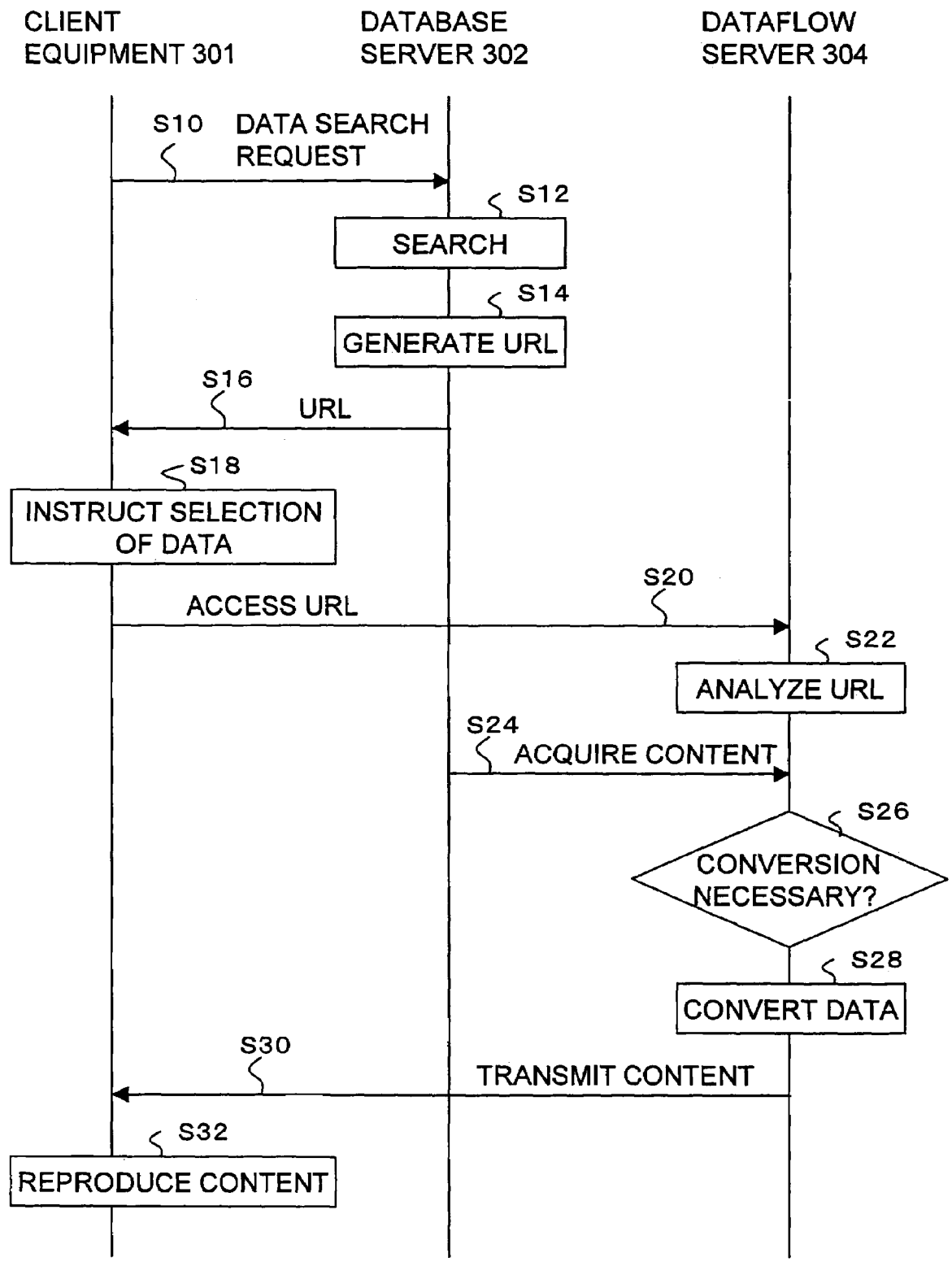
FIG. 7 is a sequence view illustrating the operation of this embodiment.

Next, a description is given of the operation of the aforementioned embodiment. Here, FIG. 7 is a sequence view illustrating the operation of this embodiment. First, the client equipment 301 sends a data list request specified by the content reproduction specification to the database server 302 via the network 305 (S10).

At the database server 302, when there is a data list request from the client equipment 301, the content database 303 is searched by the request processing unit 321 (S12), and URLs for content matching with the content reproduction specification of the data list request and URLs for content capable of being data-converted so as to match with the content reproduction specification at the dataflow server 304 are acquired. Next, data conversion specifying information is embedded by the URL processing unit 323 in the URLs for content capable of being data-converted in order to match with the content reproduction specification (S14). URLs of content matching with the content reproduction specification and virtual URLs of content embedded with data conversion specifying information capable of data conversion is returned to the client equipment 301 (S16).

URLs for desired content are then selectively specified from the content URL list returned from the database server 302 with respect to the data list request at the client equipment 301 (S18). In this way, URLs for selectively specified content are passed over to the dataflow server 304 (S20).

At the dataflow server 304, when URLs are received from the client equipment 301, the URLs are analyzed by the URL analyzing unit 342, and a determination is made as to whether data conversion specifying information is included (S22). Next, corresponding content is acquired by the data acquisition unit 343 from the content database 303 in accordance with the aforementioned URL (S24), and a determination is made as to whether data conversion is necessary (S26). If data conversion specifying information is embedded, the acquired content is sent as is to the client equipment 301 (S30). On the other hand, if data conversion specifying information is embedded, as described above, the acquired content is subjected to data compression by the data conversion unit 344 using a well-known method in such a manner that the format, size, and number of colors etc. match with the content reproduction specification of the client equipment 301, in accordance with the data conversion specifying information (S28). The content after conversion is then sent to the client equipment 301 (S30).

The content from the dataflow server 304 is then received and reproduced at the client equipment 301 (S32). Even if data existing in the content database does not match with the specification of the client equipment 301, the acquired content is converted in accordance with data attributes specified at the time of the data search request. There is therefore no problem with reproduction at the client equipment 301.

Further, according to the conventional art, when there is no content matching with the specification of the client equipment 301, search results regarding the data list request are such that there is no corresponding content (no hits). With regards to this, in this embodiment, URLs for content capable of being data-converted in order to match with the content reproduction specification specified by the data list request are returned to the client equipment 301. A situation where there are no hits for the reason that there are no matches with the specification of the client equipment 301 therefore does not exist.

In the aforementioned embodiment, content other than images (still images), such as moving images or audio data etc. is also applicable as content provided by the content distribution system.

{Notification of Presence or Absence of Data Conversion Processing for Transmission Content}

Next, a description is given of an example configuration including processing for notifying a client whether content scheduled for transmission from the server to the client is original content held on the server that has not been subjected to conversion processing or original content converted at the server to converted data.

Original content is data the server acquires from outside, such as, for example, from broadcasts, networks, or recording media such as DVD or CD etc., and is data which has not been subjected to conversion processing by data conversion means such as encoding/decoding means within the server.

As described above, when there is a data list request from the client equipment 301 via the network 305, the database server 302 executes processing to return a content URL list on the content database 303 to the client equipment 301 based on the received data list request. As described above, URLs for content matching with the content reproduction specification and URLs (virtual URLs) for content capable of being data-converted so as to match with the content reproduction specification at the dataflow server 304 are contained in the content URL list.

The actual URL for the content is returned from the database server 302 to the client equipment in the case of content having data attributes matching with the content reproduction specification specified by the client at the data list request. On the other hand, a virtual URL is returned to the client equipment from the database server 302 in the case of content that does not match with the content reproduction specification specified by the client that is content capable of data conversion at the dataflow server 304 described later. Preceding the sending of content to the client equipment 301 at the dataflow server 304, data conversion specifying information indicating data conversion content to be implemented for the content is contained in the virtual URL.

Further, conversion identification information indicating whether content corresponding to each URL is content that is not converted at the dataflow server 304, i.e. original content stored by the server, or content requiring conversion at the dataflow server 304, of, for example, a conversion information flag, is set in information returned to the client equipment from the database server 302.

For example, when content corresponding to a URL is original content that does not require conversion at the dataflow server 304, the conversion information flag, which serves as the conversion identification information, is set to {0}. When content corresponding to a URL is content requiring conversion at the dataflow server 304, a conversion information flag, which serves as the conversion identification information, is set to {1} and sent to the client. The conversion identification information is by no means limited to flag data, and may be set to various data formats such as text information or XML data, etc.

For example, in a case where file format "GIF" is specified using a data list request from the client equipment 301, the database server 302 sets data that is a combination of an actual URL for content (images) of a GIF format saved in the content database 303 and conversion identification information (conversion information flag {0}) indicating that the content is original content not requiring, conversion is set. Further, with regards to content (images) of other file formats (JPEG, etc.) existing at the content database 303 that is capable of being outputted in GIF format as a result of conversion at the dataflow server 304, data that is a combination of a virtual URL embedded with "JPEG-GIF" conversion specifying information as data conversion specifying information in a URL, and conversion identification information (conversion information flag {1}) indicating that the content requires conversion is set, and this combination of data is sent to the client equipment 301.

Further, in a case where an image of size "150×100" is specified using a data list request from the client equipment 301, the database server 302 sets data that is a combination of an actual URL for content (images) of a of size "150×100" saved in the content database 303 and conversion identification information (conversion information flag {0}) indicating that the content is original content not requiring conversion is set. Further, with regards to image data of a different size of "800×600" capable of output as images of size "150×100" by conversion at the dataflow server 304, data that is a combination of a virtual URL embedded with "800×600"-"150×100" conversion specifying information as data conversion specifying information in a URL, and conversion identification information (conversion information flag {1}) indicating that the content requires conversion is set, and this combination of data is sent to the client equipment 301.

When file format and size are specified in a data list request from the client equipment 301, a combination of data of real URLs and conversion identification information (conversion information flag {0}) indicating original content not requiring conversion is set at content matching in specified file format and size in the original data held on the server. Regarding content matching in specified file format and size and being capable of output as a result of conversion at the dataflow server 304, data that is a combination of a virtual URL embedded with conversion specifying information and conversion identification information (conversion information flag {1}) indicating content requiring conversion is set, and this combination of data is sent to the client equipment 301.

Moreover, when not just format and size but also titles are specified from the client equipment 301, when the original image data stored in the content database 303 is different to the client-specified format and size and requires data conversion, the database server 302 sends a combination of data of a virtual URL embedding data conversion specifying information in the image data URL and conversion identification information (conversion information flag {1}) indicating content requiring conversion to the client equipment 301. And when original image data stored in the content database 303 matches with the format and size specified by the client and does not require data conversion, a combination of data of the image data URL and conversion identification information (conversion information flag {0}) indicating original content not requiring conversion is sent to the client equipment 301.

An example configuration for data sent from the database server 302 to the client equipment 301 is shown with reference to FIG. 8. In the case of original content not requiring data conversion, a combination of data of a URL and conversion identification information (conversion information flag {0}) indicating original content not requiring conversion is set as shown in (a), and in the case of content (un-original content) requiring data conversion, a combination of data of a virtual URL embedded with conversion specifying information and conversion identification information (conversion information flag {1}) indicating content requiring conversion is set and sent to the client.

In the case of content that does not match with the content reproduction specification specified by the client on the content database 303 and for which data conversion at the dataflow server 304 is not possible, a URL for the content is not returned to the client equipment 301.

Accordingly, when a URL is returned from the database server 302, the client equipment 301 is capable of accessing, acquiring and reproducing data.

Figure 9:
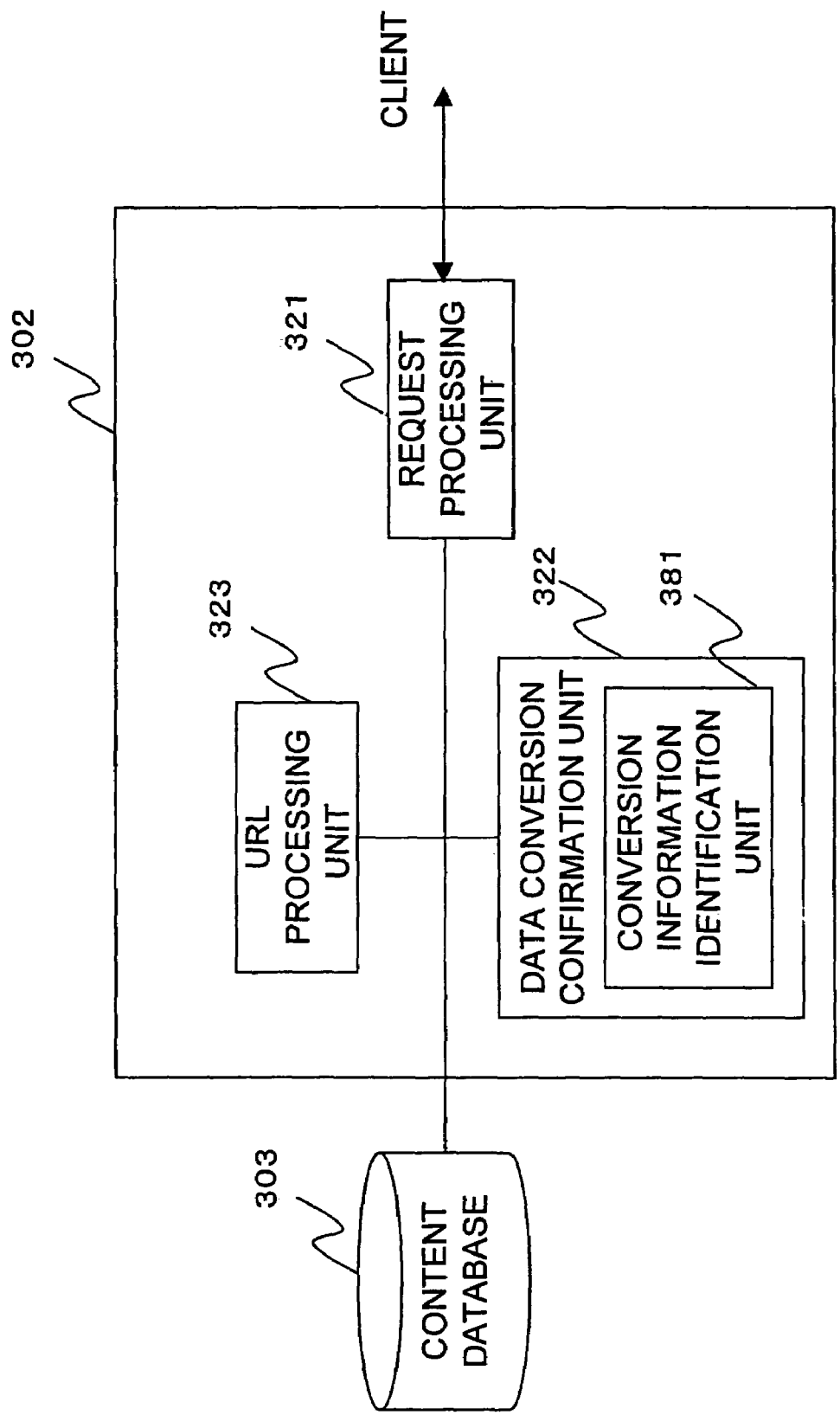
FIG. 9 is a block diagram showing a configuration for a database server having a conversion information identification unit.

A block diagram showing a configuration for a database server 302 for executing the conversion information flag setting process described above is shown in FIG. 9. The database server 302 is comprised of a request processing unit 321, data conversion confirmation unit 322, and URL processing unit 323.

The request processing unit 321 receives a data list request from the client equipment 301, acquires URLs for content matching with the content reproduction specification of the data list request from the content database 303 and URLs for content convertible to a data specification matching with the content reproduction specification requested by the client using data conversion occurring at the dataflow server 304 described later, and passes these over to the URL processing unit 323. The request processing unit 321 executes processing to transmit URL lists for content generated by processing of the URL processing unit 323 to the client equipment 301.

The data conversion confirmation unit 322 takes data list requests as input from the client equipment 301 via the request processing unit 321, analyzes content reproduction specifications designated for the client contained in the data list request, confirms whether or not data conversion is necessary for content on the content database 303, and when data conversion is necessary, notifies the URL processing unit 323 as to what kind of data conversion is required.

Further, the data conversion confirmation unit 322, at the conversion information identification unit 381, compares a content reproduction specification specified by the client and content in the content database 303, and executes processing to set conversion identification information based on a determination as to whether or not data conversion is necessary. For example, setting information of conversion identification information (conversion information flag {0}) indicating original content not requiring conversion is adopted in the case of original content not requiring data conversion, and setting information indicating (conversion information flag {1}) content requiring conversion is adopted in the case of content requiring data conversion.

The URL processing unit 323 embeds data conversion specifying information in a content URL in the case of content requiring data conversion in accordance with notification from the data conversion confirmation unit 322, i.e. in accordance with data conversion information for the cases where data conversion is necessary or not and data conversion is necessary with respect to content in the content database 303 and provides this to the request processing unit 321.

The request processing unit 321 generates a URL list comprised of a combination of data constituted by a URL generated by the URL processing unit 323 and conversion identification information set at the conversion information identification unit 381 of the data conversion confirmation unit 322 and sends this to the client equipment 301.

The URL list is data storing URLs as content access information. In the case of content matching with the content reproduction specification specified by the client, and as described with reference to FIG. 8, URLs taken as this access information and conversion identification information (conversion information flag=0) indicating original content not requiring conversion are set. In the case where there is not matching with the content reproduction specification specified by the client but the content is such that conversion to data matching with the reproduction specification using the data conversion occurring at the dataflow server 304 is possible, the set data is a virtual URL embedding data conversion specifying information in the URL and conversion identification information (conversion information flag={1}) indicating that content requires conversion.

When URL list data is received from the database server 302, the client equipment 301 displays a URL list at the display. As well as the content URLs, content titles and other content information is contained in the URL table data sent from the database server 302, with these items of information being displayed at the display as a list. Identification information as to whether content is original content not requiring conversion or content requiring conversion is also displayed based on the conversion identification information.

An example of displayed information is shown in FIG. 10. In the example shown in FIG. 10, the client equipment is equipment capable of reproducing JPEG and GIF data, and this view shows an example of displayed information generated at client equipment based on a URL list received from the database server 302 in the case where JPEG and GIF data are specified as reproduction specifications with respect to the database server 302.

URL list data from the database server 302 is, for example, composed of XML data, and displayed information is generated at the client equipment based on received XML data. The user specified content requested for reproduction based on the displayed information.

In the example shown in the figure, data entry 401 and data entry 402 show the same content. The data entry 401 is JPEG data and is original content not requiring conversion. On the other hand, data entry 402 is GIF data and is known to be content requiring conversion, i.e. data subjected to data conversion from JPEG to GIG at the dataflow server 304 according to reproduction requests by the user before being sent to the client equipment.

It is preferable to reproduce data for original content when considering deterioration of data due to data conversion. In this case, higher quality data reproduction can be carried out as a result of the user selecting content for data entry 401 as content specified for reproduction.

When URL 403 of data entry 401 is specified (clicked) by the user, the client generates a content reproduction request packet and sends this to the server. The content reproduction request packet generated by the client is, for example, an HTTP GET method request, where an HTTP GET method request designating a content URL is sent from the client to the server by specifying (clicking) URL 403 of data entry 401.

The dataflow server 304 then receives the URL from the client equipment 301, acquires content from the content database in accordance with the URL, and sends this to the client. The processing occurring at the database server is the same as the processing described above.

In the above processing example, a description is given of an example configuration where the client equipment 301 generates a display screen (UI: User Interface) capable of identifying original data information based on URL list information received from the database server, and displays this at the display so at to enable identification as to whether or not content in the displayed data is original content, and therefore make it possible for the user to select which content is to be the target of reproduction. However, when original content and content requiring conversion exists for the same content, it is also possible for a list only enabling the selection of original content to be generated at the client equipment and displayed at the display. In this case it is possible for original content to be preferentially selected for reproduction without the user being aware of whether the content is original or not.

In this way, a client is suited to the functions of its own device, it is possible to select reproducible content, and high-quality data acquisition and reproduction can be implemented using selection processing giving preference to original data.

In the aforementioned processing example, displayed information is generated based on property information received from the server and an example of processing where a user selects content based on displayed information is shown. However, rather than having a user carry out data selection processing, it is also possible for a processing program of client equipment to determine whether or not original content and converted content is included for the same content based on a URL list received from the server, so that when original content and converted content is included, automatic selections are made giving preference to URLs corresponding to original content to be taken as content requested from the server, with this then being sent to the server. In this case, processing for a user to select original content is not necessary and selections are made automatically by the client equipment giving preference to original data. It is therefore possible to perform data reproduction of original content of a high-quality without the user being aware of this.

Processing occurring at the client equipment, i.e. a series of procedures for making request to the server for data lists, acquiring URL lists from the server, specifying content for reproduction based on acquired lists, sending URLs corresponding to content specified for reproduction, receiving reproduced content, and performing reproduction processing are described with reference to the processing flowchart of FIG. 11.

In step S111, the client equipment sends a data list request to the database server. Designation of a content reproduction specification is contained in this data list request. For example, one or a plurality of various items of content reproduction specification information such as file format (JPEG, BMP, GIF, PNG, MPEG1, MPEG2, AVI, WMV, and MP3 etc.), image size (vertical×horizontal pixels), number of colors, file size, codec method, bit rate, and stereo/mono etc. are specified according to the type of content.

In step S112, the client receives a comprehensive URL list of content capable of being provided as data from the database server in the reproduction specification specified by the client. As described above, content matching with the reproduction specification specified by the client, i.e. URLs for original content, and URLs corresponding to content capable of being made to match with the reproduction specification specified by the client as a result of conversion at the dataflow server in which URLs data conversion specifying information is embedded is contained in this URL list. Further, conversion identification information capable of enabling discrimination between original and not original, for example, a conversion information flag, is also included.

In step S113, the client generates display information (UI) based on the received URL list and displays this at the display. As described with reference to FIG. 10, this is display information containing information making it possible to identify whether content capable of being provided by the server is original content not requiring conversion processing or content requiring conversion processing.

In step S114, the user decides transmission requests for reproduction target content based on content information displayed at the display of the client equipment. In step S115, the user sends URLs corresponding to requested content for which transmission is decided upon to the dataflow server.

At the dataflow server, data acquisition is executed based on URL information received from the client, and when conversion specifying information is contained in the URL, data conversion processing is executed in accordance with specified information and this is sent to the client. In step S116, the client receives content from the server and executes reproduction processing.

Figure 11:
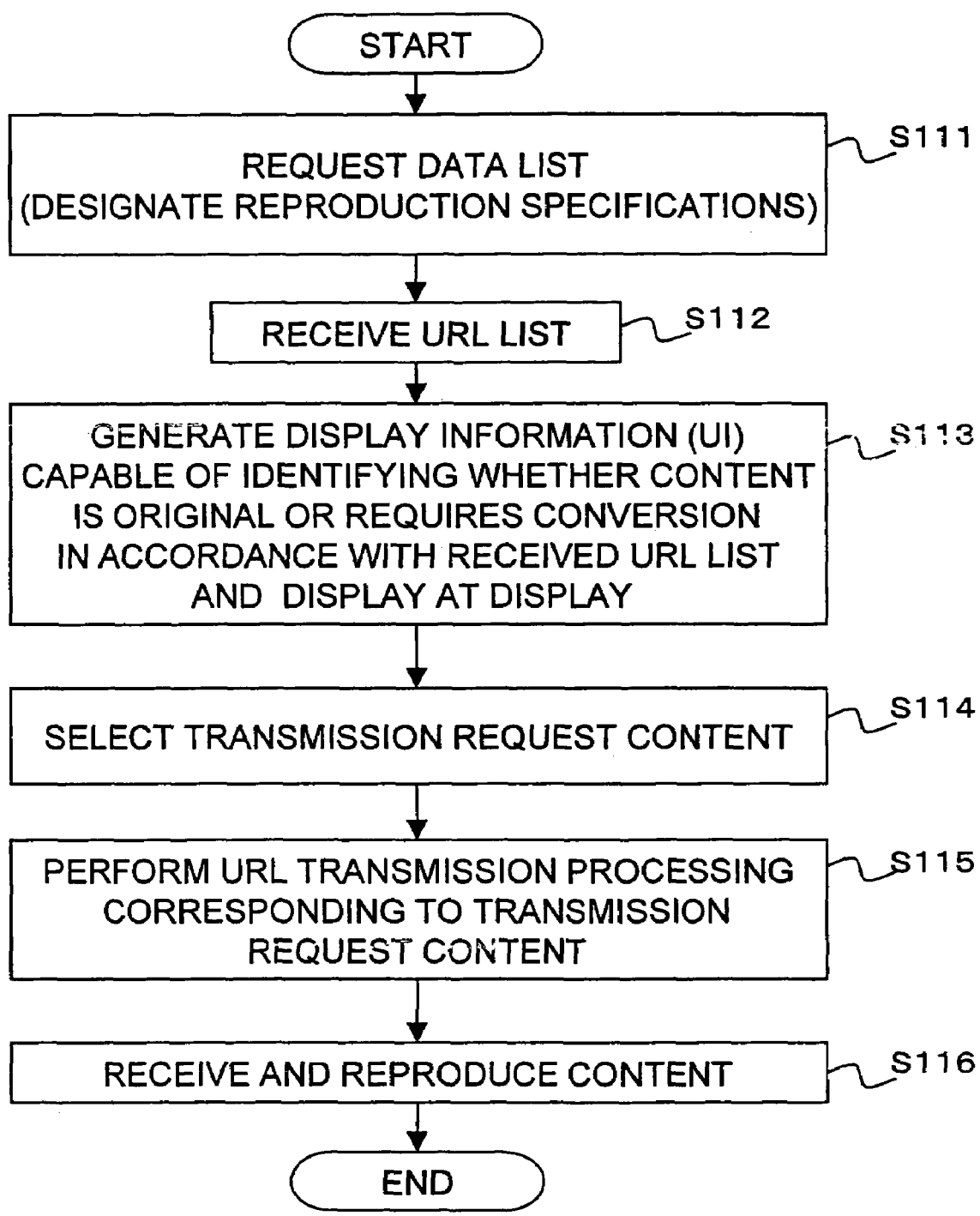
FIG. 11 is a view showing a flowchart illustrating a processing procedure for deciding a specification for transmitted data based on URL list information transmitted from a server to a client, making a content request, and receiving.

The processing example shown in FIG. 11 is a processing example where displayed information is generated based on property information received from the server, with the user then selecting data specifications based on the displayed information. However, as described above, a configuration is also possible where a selection process made by the operator is not carried out, but rather, a determination is made as to whether or not original content and non-original content is included for the same content based on the URL list received from the client equipment. When included, a selection is made giving preference to original content, with processing then being carried out to automatically send a content request specified by the original content URL to the server.

Figure 12:
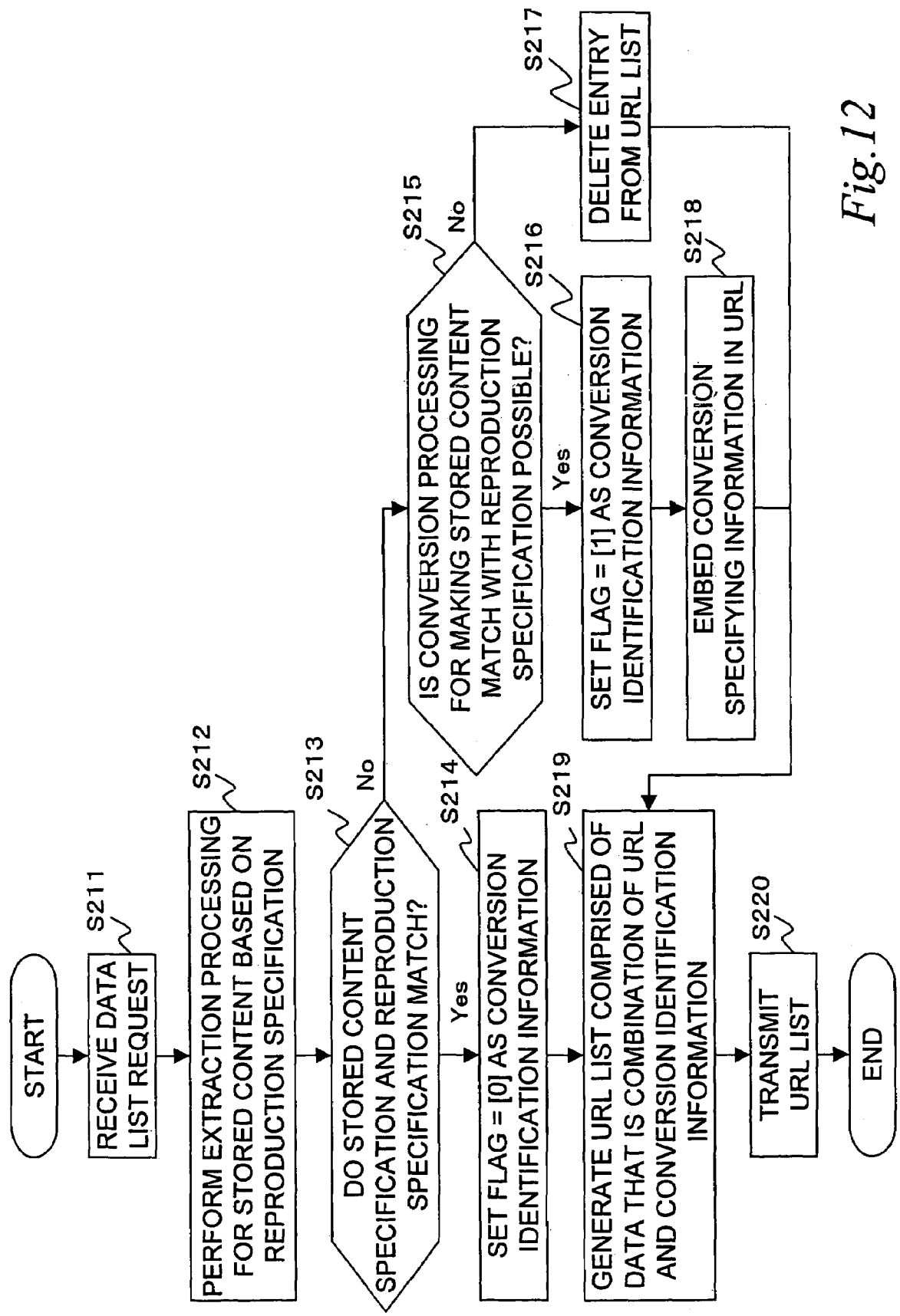
FIG. 12 is a view showing a flowchart illustrating a processing procedure for generating a URL list for sending to a client at a database server.

Next, a description is given with reference to FIG. 12 of a procedure for generating URL lists and performing transmission processing executed at the database server. First, in step S211, the database server receives a data list request from a client. Reproduction specifications specified by the client, i.e. one or a plurality of various items of content reproduction specification information such as file format (JPEG, BMP, GIF, PNG, MPEG1, MPEG2, AVI, WMV, and MP3 etc.), image size (vertical×horizontal pixels), number of colors, file size, codec method, bit rate, and stereo/mono etc. are included in this request according to the type of content. In step S212, the database server executes content extraction based on the reproduction specification specified by the client.

Specifically, the processing of steps S213 to S219 is executed for each item of content stored in the content database. First, in step S213, a determination is made as to whether or not the specification of the stored content and the reproduction specification specified by the client match.

In the case of matching, in step S214, a conversion information flag={0} is set as conversion identification information indicating original content not requiring conversion. In step S219, data that is a combination of a content URL and conversion identification information (conversion information flag={0}) is set as a URL list entry.

When it is determined in step S213 that the stored content specification and the reproduction specification specified by the client do not match, in step S215, a determination is made as to whether or not data conversion of the stored content, i.e. whether or not it is possible to ensure matching with the client-specified reproduction specification using conversion processing applying conversion functions possessed by the dataflow server, is determined.

When data conversion processing to achieve matching is possible, in step S216, a conversion information flag={1} is set as conversion identification information indicating content requiring conversion. In step S218, a virtual URL embedding conversion specifying information in a content URL is generated. In step S219, data that is a combination of a virtual URL and conversion identification information (conversion information flag={1}) is set as a URL list entry.

When it is determined in step S215 that it is not possible to cause matching with the reproduction specification specified by the client using data conversion of the stored content, in step S217, this is deleted from the URL list entry.

A URL list comprised of URLs for original content having a data specification matching with the reproduction specification specified by the client and URLs for content capable of being made to match with the reproduction specification specified by the client using data conversion is generated by the above processing. Further, conversion identification information capable of enabling discrimination between original and not original is included in this URL list. It is also possible to include various information indicating content such as content title in the URL list.

In step S220, the database server sends a URL list to the client.

The client determines whether or not content is original in accordance with the URL list received from the database server, executes preferential selection of original content in accordance with the user or a processing program of the client equipment, sends URLs for selected content to the dataflow server, and executes reproduction of content received from the dataflow server.

As described above, in the configuration of this embodiment, a client is suited to the functions of its own device, it is possible to select reproducible content, and high-quality data acquisition and reproduction can be implemented using selection processing giving preference to original data.

{Functional Configuration of Server and Client}

The hardware configuration of the server and client equipment is as described previously with reference to FIG. 2. Each of the processes described above are executed by CPUs taken as control units in accordance with programs stored in the respective storage units of the server and client.

Processing executed by the CPU, for example, on the server side, is processing for acquiring URL information corresponding to content and information regarding the necessity of conversion, generating a URL list, and sending this to the client, processing of acquiring content based on the receipt of URLs from the client, data conversion processing performed as necessary, and processing for sending content to the client, etc.

Client-side processing may consist of processing for displaying a content information list at a display based on a URL list comprised of, for example, XML data received from a server, processing for deciding content to be requested from the server based on content information and conversion identification information, processing for controlling reproduction of received content, and processing for preferentially selecting original content based on a URL list on the client side, deciding upon content to be requested from the server, and automatically sending URLs for the decided content, etc.

Basically, this processing is executed under the control of CPUs taken as control units of the server and client equipment. Server function configurations required to execute the aforementioned processing is as described based on FIG. 5 and FIG. 6. As described previously, each of the database server 302, dataflow server 304, and content database 303 shown in FIG. 3 may be configured as an integrated device or may be configured connected to a network. A content distribution apparatuses may then be configured from a database server 302, dataflow server 304, and content database 303. A client function configuration is described with reference to FIG. 13.

A packet transceiver unit 601 receives packets for the server and packets from the server. A packet generation/analysis unit 602 carries out processing for generating packets to be transmitted and processing for analyzing received packets. This is not just analysis of data stored in a packet, but also includes processing for setting packet addresses, recognizing addresses, storing data for data units, and acquiring data from the data units, etc.

Storage unit 603 stores content contained in packets received from the server and client codec information, etc.

An output unit 604 contains a speaker and display to which the content reproduction processing is applied. The display also utilizes the output of display information described previously with reference to FIG. 10. An input unit 605 is constituted, for example, from a keyboard and other data input means for executing the inputting of selected information for the data specification of content displayed as displayed information.

An XML data analysis unit 606 analyzes XML data containing content URLs etc. received from the server, generates displayed information described, for example, with reference to FIG. 10, based on the analyzed data, and executes processing for outputting to a display taken as an output unit.

A reproduction request content deciding unit 607 executes processing for deciding content for carrying out transmission requests with respect to the server based on content URLs received from the server and conversion identification information. This is processing for preferentially selecting original content, deciding upon content to be requested from the server, and automatically transmitting URLs for the decided content.

A data conversion unit 608 executes processing for converting data of the content data received from the server. For example, data decoding processing etc. is executed based on ATRA3, or MPEG4. A configuration for executing processing for recoding decoded data, and executing processing for storing recoded data in the storage unit 603 is also possible.

Figure 6:
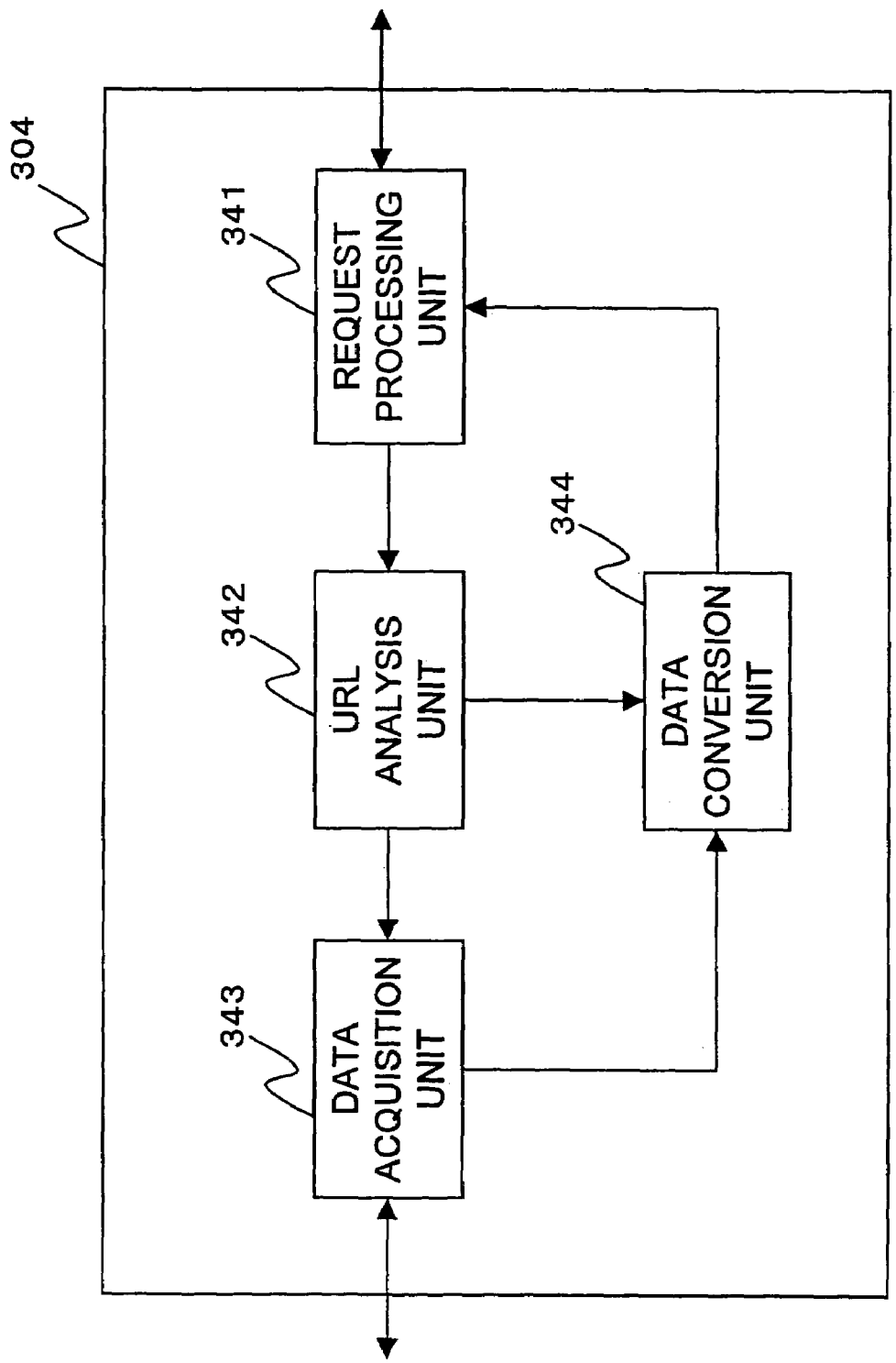
FIG. 6 is a block diagram showing a configuration for a dataflow server 304.
Figure 13:
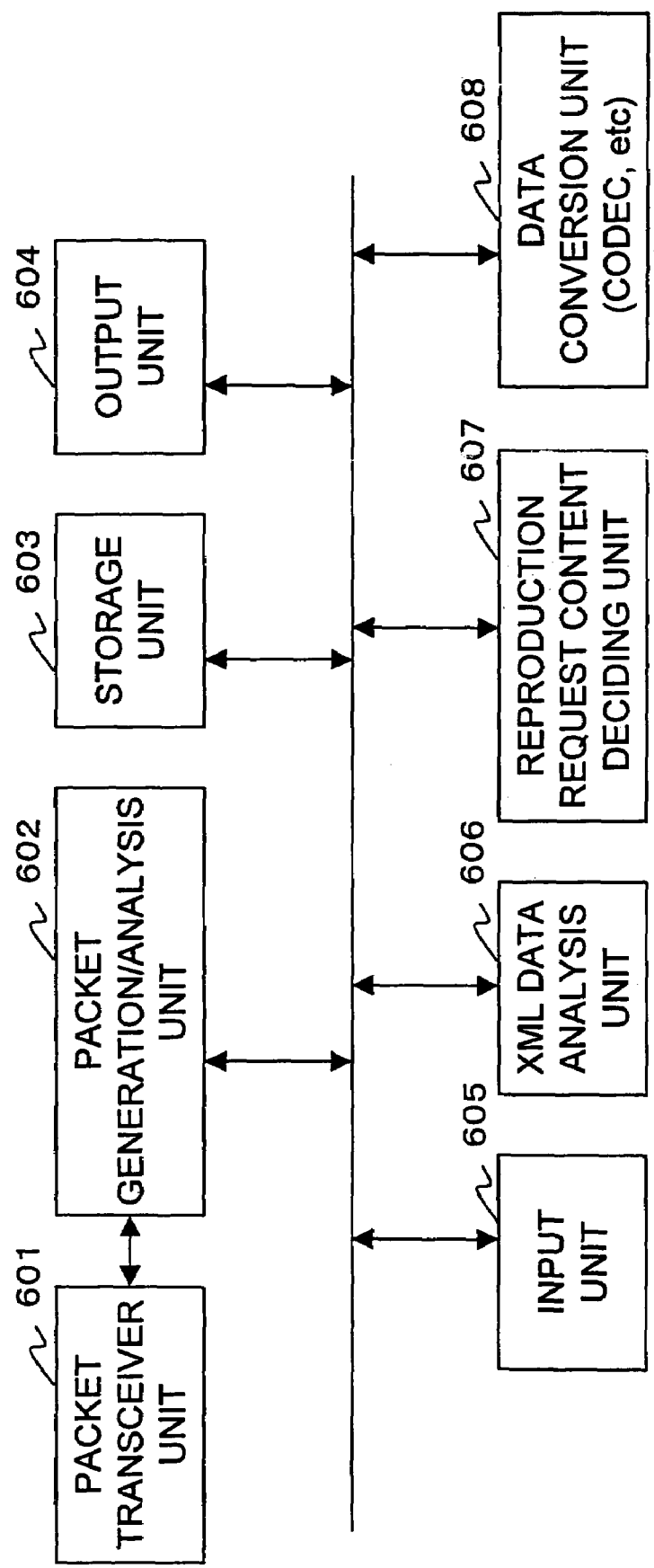
FIG. 13 is a block diagram illustrating a client processing function.

Functionally, the server has each of the functions shown in FIG. 5 and FIG. 6, and functionally, the client has each of the functions shown in FIG. 13, thus executing each of the aforementioned processes. However, the block diagrams shown in FIG. 5, FIG. 6 and FIG. 13 are block diagrams illustrating functions, and in reality, various processing programs are executed under the control of the CPU of the hardware configuration shown in FIG. 2.

As described above, a detailed description of the present invention is given with reference to specific embodiments. However, it is evident that one skilled in the art may come up with variations and substitutions of the aforementioned embodiment without deviating from the essential essence of the present invention. Namely, the present invention as disclosed above is merely cited as an example, and should by no means be interpreted as being limiting. The essence of the present invention is to be discerned while taking into consideration the patent claims as laid out at the beginning.

The series of processes described in the specification may be executed using a hardware configuration, a software configuration, or a combination of both. In the case of executing processing using software, a program recording a processing sequence may be executed through installation in a memory within a computer incorporated into dedicated hardware, or may be executed through installation of a program on a general purpose computer capable of executing each various process.

For example, a program may be pre-recorded on a hard disc or ROM (Read Only Memory) constituting a recording medium. Alternatively, the program may be temporarily or permanently stored (recorded) on a removable recording media such as a flexible disc, CD-ROM (Compact Disc Read Only Memory), MO (Magneto-optical) disc, DVD (Digital Versatile Disc), magnetic disc, or semiconductor memory, etc. This kind of removable recording media may be provided as so-called "package software".

In addition to being installed on a computer from a removable recording media as described above, the program may be wirelessly transferred to a computer from a download site, transferred to a computer in a wired manner via a LAN (Local Area Network) or internet, with a program being transferred in this manner being received by a computer, and installed in a recording media such as a built-in hard disc.

Each of the processes disclosed in the specification do not have to be executed in chronological order in accordance with the disclosure, but may also be executed in order of processing power of devices executing the processing, or in parallel or individually as necessary. The system in this specification is configured from a plurality of apparatuses in a logically collected structure, and is by no means limited to each apparatus of the configuration being in the same box.

INDUSTRIAL APPLICABILITY

As described above, according to the configuration of the present invention, at a server for executing content information transmission processing, a configuration is adopted where address information containing content address information matching with reproduction specification information specified by a client and virtual address information embedding data conversion specifying information in address information for content capable of being made to match with a reproduction specification specified by a client using data conversion processing is generated based on receipt of a content data list request storing reproduction specification information from a client and sent to the client, and a configuration is adopted where data conversion information is acquired from virtual address information based on a content request stored in address information from a client, necessary data conversion is executed, and is sent to the client. Accordingly, on the server side, it is not necessary to hold content of different specifications corresponding to various clients, and transmission of content compatible with a client can be effectively implemented by performing accurate data conversion according to a client specification in accordance with requests from a client.

Further, according to the configuration of the present invention, a conversion information flag taken as conversion information for identifying whether content for the server is content matching with a client specified reproduction specification that does not require data conversion or content requiring data conversion is sent to the client. The client is then capable of selecting content for reproduction giving priority to original content for which the possibility of data deterioration is low, so as to enable high-quality reproduction to be carried out.

Further, according to the configuration of the present invention, the content storage means for storing a plurality of content is prepared, the address information indicating the whereabouts of corresponding content from the content storage means is acquired by the address information acquisition means based on the content reproduction specification of the data list request received by the data list request receiving means, whether or not data conversion is necessary for content acquired using the address information by the address information acquisition means is determined based on the content reproduction specification of the data list request by the data conversion determination means, data conversion specifying information is embedded in the acquired address information by the address information acquisition means when it is determined that data conversion is necessary by the data conversion determination means, address information for the acquired content or the converted address information is returned to the client equipment by the address information returning means, the address information is received from the client equipment by the address information receiving means, corresponding content is acquired from the content storage means based on address information from the client equipment by the content acquisition means, the received address information is analyzed by the analysis means, content acquired by the content acquisition means is data converted by the data conversion means based on the data conversion specifying information when it is analyzed that data conversion specifying information is embedded in address information from the client equipment, and the obtained content or the data-converted content is sent to the client equipment by the content transmission means. This brings about the benefit that it is possible to distribute appropriate content according to the specification of client equipment without preparing content of a plurality of formats.

Further, according to the configuration of the present invention, the address information acquisition means acquires address information for content matching with said content reproduction specification for said data list request, and address information for content capable of being data-converted in order to match with said reproduction specification of said data list request. The advantage is therefore obtained that it is possible to distribute appropriate content according to the specification of client equipment without preparing content of a plurality of different formats.

Further, according to the configuration of the present invention, the content is defined as still image data, moving image data, or audio data. The advantage is therefore obtained that it is possible to distribute appropriate content according to the specification of client equipment without preparing content of a plurality of different formats.

Further, according to the configuration of the present invention, the content reproduction specification is one or a combination of content identification information, file format, image size, number of colors, or file size, when the content is still image data. The advantage is therefore obtained that it is possible to distribute appropriate content according to the specification of client equipment without preparing content of a plurality of different formats.

Further, according to the configuration of the present invention, the content reproduction specification is one or a combination of content identification information, file format, moving image size, code method, bit rate file format, or file size, when the content is moving image data. The advantage is therefore obtained that it is possible to distribute appropriate content according to the specification of client equipment without preparing content of a plurality of different formats.

Further, according to the configuration of the present invention, the content reproduction specification is one or a combination of content identification information, file format, bit rate, or stereo/mono, when the content is audio data. The advantage is therefore obtained that it is possible to distribute appropriate content according to the specification of client equipment without preparing content of a plurality of different formats.

Further, according to the configuration of the present invention, there are provided advantages of distributing appropriate content according to specifications of client equipment without preparing content of a plurality of formats are obtained by: receiving data list requests designated by the content reproduction specification from the client equipment and acquiring address information indicating the whereabouts of corresponding content based on the content reproduction specification of the data list request; determining whether or not data conversion is necessary for content acquired by the address information based on the content reproduction specification of the data list request and embedding data conversion specifying information in the acquired address information when it is determined that data conversion is necessary; returning the acquired address information or the converted address information to the client equipment; receiving address information from the client equipment, acquiring one of the corresponding content based on the received address information, analyzing address information from the client equipment and subjecting the acquired content to data conversion based on the data conversion specifying information when it is analyzed that data conversion specifying information is embedded; and sending the acquired content or the data-converted content to the client equipment.

Further, according to the configuration of the present invention, steps of: a step of receiving data list requests designated by the content reproduction specification from the client equipment; a step of acquiring address information indicating the whereabouts of corresponding content based on the content reproduction specification of the data list request; a step of determining whether or not data conversion is necessary for content acquired by the address information based on the content reproduction specification of the data list request; a step of embedding data conversion specifying information in the acquired address information when it is determined that the data conversion is necessary; a step of returning the acquired address information or the converted address information to the client equipment; a step of receiving address information from the client equipment; a step of acquiring one of the corresponding content based on the received address information; a step of analyzing address information from the client equipment; a step of subjecting the acquired content to data conversion based on the data conversion specifying information when it is analyzed that the data conversion specifying information is embedded; and a step of sending the acquired content or the data-converted content to the client equipment, are implemented on a computer. The advantage is therefore obtained that it is possible to distribute appropriate content according to the specification of client equipment without preparing content of a plurality of different formats.

Further, according to the configuration of the present invention, the address information acquisition step acquires address information for content matching with said content reproduction specification for said data list request, and address information for content capable of being data-converted in order to match with said reproduction specification of said data list request. The advantage is therefore obtained that it is possible to distribute appropriate content according to the specification of client equipment without preparing content of a plurality of different formats.

Further, according to the configuration of the present invention, steps of: a step of receiving data list requests designated by the content reproduction specification from the client equipment; a step of acquiring address information indicating the whereabouts of corresponding content based on the data list request; a step of determining whether or not data conversion is necessary for content acquired by the address information based on the content reproduction specification of the data list request; a step of embedding data conversion specifying information in the acquired address information when it is determined that the data conversion is necessary; and a step of returning the acquired address information or the converted address information to the client equipment, are executed on a computer. The advantage is therefore obtained that it is possible to distribute appropriate content according to the specification of client equipment without preparing content of a plurality of different formats.

The invention claimed is:

1. An information processing apparatus for executing content information transmission processing comprising:

a central processing unit and memory;

the memory comprising computer instructions for execution by the central processing unit containing:

a hardware storage unit configured to store content that includes at least one of audio content and image content;

a request processing unit on the information processing apparatus configured to receive a content data list request including a reproduction specification from a client configured to reproduce the content, and acquire an address URL(uniform resource locator) indicating whereabouts of the content stored in said hardware storage unit based on said content data list request; and a data conversion confirmation unit on the information processing apparatus configured to determine whether the content stored in said hardware storage unit matches the reproduction specification from the client, determine whether the stored content converts to match the reproduction specification by performing, at the information processing apparatus, a data conversion processing of the stored content and generate data conversion specifying information including a first identifier that identifies an original format of the content and a second identifier that identifies a content format according to the reproduction specification;

said request processing unit is further configured to generate a content list including a first version entry corresponding to a first version of the content and a second version entry corresponding to a second version of the content, the first version of the content and the second version of the content each including the content in a different reproduction format, the first version entry including first address information indicating a location of the first version of the content, and first content version conversion identification information indicating that the data conversion processing is not required to be performed at the information processing apparatus to make the first version of the content match the reproduction specification, wherein said first address information includes a first URL (Uniform Resource Locators) set corresponding to the location of the first version of the content, the second version entry including second address information indicating a location of the second version of the content, and second content version conversion identification information indicating that the data conversion processing performed at the information processing apparatus is required to make the second version of the content match the reproduction specification, and wherein the second address information further including the data conversion specifying information and a second URL (Uniform Resource Locators) corresponding to the location of the second version of the content; and said request processing unit further configured to receive a selected URL (Uniform Resource Locators) of the first version of content or second version of content in the content list from the client, and returns the content specified by the URL to the client to be reproduced and displayed, wherein if the URL selected from the content list is the first address information of the first version of content, the content in the original format is unconverted and the unconverted content in the original format is returned to the client, and wherein if the URL selected from the content list is the second address information of the second version of content, the content is converted using the data conversion specifying information to match the reproduction specification and the converted content is returned to the client; and said client including a data transceiver unit configured to transmit the content data list request to the information processing apparatus, receive the content list from the information processing apparatus, and sending selection of a URL from the first address information of the first version of content or the second address information of the second version of content from the content list;

a control unit configured to generate a display information based on the content list received from said information processing apparatus by said data transceiver unit, and generate the display information indicating whether the content requires the data conversion processing at said information processing apparatus based on the first content version conversion identification information from the first version of the content and the second content version conversion identification information from the second version of the content;

a display unit configured to display the display information generated by said control unit, and the content returned to client.

2. The information processing apparatus as disclosed in claim 1, wherein:

said reproduction specification includes at least one of a file format, data size, number of colors, file size, codec method, bit rate, file size, or audio mode; and said data conversion confirmation unit is further configured to determine whether the content converts to match the reproduction specification by performing the data conversion processing with at least one of said file format, image size, number of colors, file size, codec format, bit rate, file size, or audio mode in said reproduction specification specified by said client.

3. A content distribution system comprising:

a central processing unit and memory;

a server configured to execute content information transmission processing; and a client configured to request transmission of a content from said server and reproduce the content, the content including at least one of an audio content and an image content, and said server including a hardware storage unit configured to store the content, a request processing unit configured to receive a content data list request including a reproduction specification from the client configured to reproduce the content, and acquire an address URL (uniform resource locator) indicating the whereabouts of content stored in said hardware storage unit based on said content data list request, a data conversion confirmation unit configured to determine whether the content stored in said storage unit matches the reproduction specification, determine whether the stored content converts to match the reproduction specification by performing, at the server, a data conversion processing of the stored content, and generate data conversion specifying information including a first identifier that identifies an original format of the content and a second identifier that identifies a content format according to the reproduction specification, said request processing unit is further configured to generate a content list including a first version entry corresponding to a first version of the content and a second version entry corresponding to a second version of the content, the first version of the content and the second version of the content each including the content in a different reproduction format, the first version entry including first address information indicating a location of the first version of the content, and first content version conversion identification information indicating that the data conversion processing is not required to be performed at the information processing apparatus to make the first version of the content match the reproduction specification, wherein said first address information includes a first URL (Uniform Resource Locators) set corresponding to the location of the first version of the content, the second version entry including second address information indicating a location of the second version of the content, and second content version conversion identification information indicating that the data conversion processing performed at the information processing apparatus is required to make the second version of the content match the reproduction specification, and wherein the second address information further including the data conversion specifying information and a second URL (Uniform Resource Locators) corresponding to the location of the second version of the content; and said request processing unit further configured to receive a selected URL (Uniform Resource Locators) of the first version of content or second version of content in the content list from the client, and returns the content specified by the URL to the client to be reproduced and displayed, wherein if the URL selected from the content list is the first address information of the first version of content, the content in the original format is unconverted and the unconverted content in the original format is returned to the client, and wherein if the URL selected from the content list is the second address information of the second version of content, the content is converted using the data conversion specifying information to match the reproduction specification and the converted content is returned to the client; and and said client including a data transceiver unit configured to transmit the content data list request to the server, receive the content list from the server, and sending a selected URL of the first address information of the first version of content or the second address information of the second version of content from the content list a control unit configured to generate a display information based on the content list received from said server by said data transceiver unit, and generate the display information indicating whether the content requires the data conversion processing at said sewer based on the first content version conversion identification information from the first version of the content and second content version conversion identification information from the second version of the content; and a display unit configured to display the display information generated by said control unit and the content returned to the client.

4. The content distribution system as disclosed in claim 3, wherein:

the control unit is further configured to preferentially select the first version of the content based on the content list received from said sewer by said data transceiver unit, and request said selected first version of the content from the server.

5. An information processing method for executing content information transmission processing, said method comprising:

receiving a content data list request including a reproduction specification from a client configured to reproduce the content;

acquiring an address URL (uniform resource locator) indicating whereabouts of a content stored in a storage unit based on said content data list request, the content including at least one of an audio content and an image content;

determining whether the content stored in the storage unit matches the reproduction specification, determining whether the stored content converts to match the reproduction specification by performing a data conversion processing of the stored content at a content server computer, and generating data conversion specifying information including a first identifier that identifies an original format of the content and a second identifier that identifies a content format according to the reproduction specification; and generating a content list including a first version entry corresponding to a first version of the content and a second version entry corresponding to a second version of the content, the first version of the content and the second version of the content each including the content in a different reproduction format, the first version entry including first address information indicating a location of the first version of the content, and first content version conversion identification information indicating that the data conversion processing is not required to be performed at the information processing apparatus to make the first version of the content match the reproduction specification, wherein said first address information includes a first URL (Uniform Resource Locators) set corresponding to the location of the first version of the content, the second version entry including second address information indicating a location of the second version of the content, and second content version conversion identification information indicating that the data conversion processing performed at the information processing apparatus is required to make the second version of the content match the reproduction specification, and wherein the second address information further including the data conversion specifying information and a second URL (Uniform Resource Locators) corresponding to the location of the second version of the content; and receiving, at the content server computer, a selected URL (Uniform Resource Locators) of the first version of content or second version of content in the content list from the client, and the content server returning the content specified by the selected URL to the client to be reproduced and displayed;
  wherein if the URL selected from the content list is the first address information of the first version of content, the content in the original format is unconverted and the unconverted content in the original format is returned to the client, and
  wherein if the URL selected from the content list is the second address information of the second version of content, the content is converted using the data conversion specifying information to match the reproduction specification and the converted content is returned to the client; and
transmitting the content data list request to the content server computer, receiving the content list from the content server computer, and sending a selected URL of the first address information of the first version of content or the second address information of the second version of content from the content list, by the client
generating, by the client, a display information based on the content list received from said content server, and generating the display information indicating whether the content requires the data conversion processing at said content sewer based on the first content version conversion identification information from the first version of the content and second content version conversion identification information from the second version of the content; and
displaying, by the client, the display information generated and the content returned to client.

6. The information processing method as disclosed in claim 5, wherein:
  said reproduction specification includes at least one of a file format, data size, number of colors, file size, codec method, bit rate, file size, or audio mode; and
  said determining whether the content stored in the storage unit matches reproduction specification further comprises determining whether the content converts to match the reproduction specification by performing the data conversion processing with at least one of said file format, image size, number of colors, file size, codec format, bit rate, file size, or audio mode in said reproduction specification specified by said client.

7. A computer readable storage medium including encoded program instructions which when executed by a processor to process content information transmission, result in the processor performing steps comprising:
  receiving a content data list request including a reproduction specification from a client configured to reproduce the content;
  acquiring an address URL (uniform resource locator) indicating whereabouts of a content stored in a storage unit based on said content data list request, the content including at least one of an audio data and an image data;
  determining whether the content stored in said storage unit matches the reproduction specification, determining whether the stored content converts to match the reproduction specification by performing a data conversion processing of the stored content at a server, and generating data conversion specifying information including a first identifier that identifies an original format of the content and a second identifier that identifies a content format according to the reproduction specification; and
  generating a content list including a first version entry corresponding to a first version of the content and a second version entry corresponding to a second version of the content, the first version of the content and the second version of the content each including the content in a different reproduction format,
  the first version entry including first address information indicating a location of the first version of the content, and first content version conversion identification information indicating that the data conversion processing is not required to be performed at the server to make the first version of the content match the reproduction specification,
    wherein said first address information includes a first URL (Uniform Resource Locators) set corresponding to the location of the first version of the content,
  the second version entry including second address information indicating a location of the second version of the content, and second content version conversion identification information indicating that the data conversion processing performed at the information processing apparatus is required to make the second version of the content match the reproduction specification, and
    wherein the second address information further including the data conversion specifying information and a second URL (Uniform Resource Locators) corresponding to the location of the second version of the content; and
receiving, at the server, a selected URL (Uniform Resource Locators) of the first version of content or second version of content in the content list from the client, and returns the content specified by the URL to the client to be reproduced and displayed;
  wherein if the URL selected from the content list is the first address information of the first version of content, the content in the original format is unconverted and the unconverted content in the original format is returned to the client, and
  wherein if the URL selected from the content list is the second address information of the second version of content, the content is converted using the data conversion specifying information to match the reproduction specification and the converted content is returned to the client; and
wherein transmitting the content data list request to the server, receiving the content list from the server, and sending a selected URL of the first address information of the first version of content or the second address information of the second version of content from the content list is by the client;
generating, by the client, a display information based on the content list received from said content server, and generating the display information indicating whether the content requires the data conversion processing at said content server based on the first content version conversion identification information from the first version of the content and second content version conversion identification information from the second version of the content; and
displaying, by the client, the display information generated and the content returned to client.

8. A content distribution apparatus comprising:
a central processing unit and memory;
a hardware storage unit configured to store a content including at least one of an audio content and an image content;
means for receiving a data list request including a content reproduction specification from a client equipment configured to reproduce the content;

means for acquiring an address information URL (uniform resource locator) indicating whereabouts of the content stored in said storage unit based on said data list request;

means for determining whether the content stored in said storage unit matches said content reproduction specification of said data list request;

means for determining whether the stored converts to match the reproduction specification by performing a data conversion processing of the stored content;

means for generating data conversion specifying information including first identifier that identifies an original format of the content and a second identifier that identifies a content format according to the reproduction specification; and means for returning to said client equipment a content list including a first version entry corresponding to a first version of the content and a second version entry corresponding to a second version of the content, the first version of the content and the second version of the content each including the content in a different reproduction format, the first version entry including first address information indicating a location of the first version of the content, and the first content version conversion identification information indicating that the data conversion processing is not required to be performed at the information processing apparatus to make the first version of the content match the reproduction specification, wherein said first address information includes a first URL (Uniform Resource Locators) set corresponding to the location of the first version of the content, the second version entry including second address information indicating a location of the second version of the content, and second content version conversion identification information indicating that the data conversion processing performed at the information processing apparatus is required to make the second version of the content match the reproduction specification, and wherein the second address information further including the data conversion specifying information and a second URL (Uniform Resource Locators) corresponding to the location of the second version of the content; and receiving a selected URL (Uniform Resource Locators) of the first version of content or second version of content in the content list from the client, and returns the content specified by the URL to the client to be reproduced and displayed;

wherein if the URL selected from the content list is the first address information of the first version of content, the content in the original format is unconverted and the unconverted content in the original format is returned to the client, and wherein if the URL selected from the content list is the second address information of the second version of content, the content is converted using the data conversion specifying information to match the reproduction specification and the converted content is returned to the client; and transmitting the content data list request to the content distribution apparatus, receive the content list from the content distribution apparatus, and sending a selected URL of the first address information of the first version of content or the second address information of the second version of content from the content list by the client equipment;

generating, by said client equipment, a display information based on the content list received from said content distribution apparatus, and generate the display information indicating whether the content requires the data conversion processing at said content distribution apparatus based the first content version conversion identification information from the first version of the content and second content version identification information from the second version of the content; and displaying the display information generated and the content returned to client.

9. The content distribution apparatus as disclosed in claim 8, wherein:
said content includes at least one of still image data, moving image data, or audio data.

10. The content distribution apparatus as disclosed in claim 9, wherein:
20 said content reproduction specification includes at least one of content identification information, file format, image size, number of colors, or file size, when said content includes the still image data.

11. The content distribution apparatus as disclosed in claim 9, wherein:
said content reproduction specification includes at least one of content identification information, file format, moving image size, codec method, bit rate file format, or file size, when said content includes the moving image data.

12. The content distribution apparatus as disclosed in claim 9, wherein:
said content reproduction specification includes at least one of content identification information, file format, bit rate, or stereo/mono, when said content includes the audio data.

* * * * *